US006985782B1

(12) United States Patent
Watanabe

(10) Patent No.: US 6,985,782 B1
(45) Date of Patent: Jan. 10, 2006

(54) AUDIO CONTROL SIGNAL TRANSMISSION APPARATUS AND RECEPTION APPARTUS, CONTROL SYSTEM AND CONTROL METHOD USING AN AUDIO CONTROL SIGNAL, PROGRAM INFORMATION TRANSMISSION APPARATUS AND TRANSMISSION METHOD, AND PROGRAM RESERVATION APPARATUS AND PROGRAM RESERVATION METHOD

(75) Inventor: Koichiro Watanabe, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/123,123

(22) Filed: Jul. 27, 1998

(30) Foreign Application Priority Data

Jul. 28, 1997 (JP) ............................ P09-201868

(51) Int. Cl.
*G06F 17/00* (2006.01)
*H04B 3/00* (2006.01)
*H04N 7/08* (2006.01)
*H04N 7/00* (2006.01)
*H03G 3/00* (2006.01)

(52) U.S. Cl. ................... 700/94; 348/484; 348/460; 348/480; 381/77; 381/61

(58) Field of Classification Search ............ 381/2–3, 381/19–23, 61; 455/68, 69, 70; 700/94
See application file for complete search history.

(56) References Cited

U.S. PATENT DOCUMENTS

| | | | | | |
|---|---|---|---|---|---|
| 5,070,404 | A | * | 12/1991 | Bullock et al. | 348/460 |
| 5,129,098 | A | * | 7/1992 | McGirr et al. | 455/69 |
| 5,203,020 | A | * | 4/1993 | Sato et al. | 455/68 |
| 5,214,705 | A | * | 5/1993 | Kloker et al. | 381/2 |
| 5,497,372 | A | * | 3/1996 | Nankoh et al. | 370/480 |
| 5,815,206 | A | * | 9/1998 | Malladi et al. | 375/240.01 |
| 5,877,821 | A | * | 3/1999 | Newlin et al. | 348/724 |
| 6,044,248 | A | * | 3/2000 | Mochizuki et al. | 340/7.47 |
| RE37,131 | E | * | 4/2001 | Mankovitz | 455/66.1 |

* cited by examiner

*Primary Examiner*—Laura A. Grier
(74) *Attorney, Agent, or Firm*—Oblon, Spivak, McClelland, Maier & Neustadt, P.C.

(57) ABSTRACT

An audio control signal transmission apparatus and reception apparatus, an audio control signal based control system and control method, a program information transmission apparatus and transmission method, and a program reservation apparatus and program reservation method which can realize a control system in which a control signal is superimposed on an audio signal so as to be transmitted and to operate at a distance a reception apparatus capable of receiving the signal and an apparatus connected to the reception apparatus.

1 Claim, 26 Drawing Sheets

| CONTROL INSTRUCTION | AUDIO CONTROL SIGNAL (DTMF SIGNAL STRING) |
|---|---|
| VIDEO OUTPUT OFF | 1 # |
| VIDEO OUTPUT ON | 2 # |
| POWER OFF | 3 # |

| CONTROL INSTRUCTION | AUDIO CONTROL SIGNAL (DTMF SIGNAL STRING) |
|---|---|
| POWER ON | 21# |
| POWER OFF | 22# |
| VIDEO RECORDING START | 23# |
| STOP | 24# |

FIG.13

| CHARACTER INFORMATION | AUDIO CHARACTER SIGNAL (DTMF SIGNAL STRING) |
|---|---|
| A | 001# |
| B | 002# |
| AB | 003# |

FIG.16

| DATA No. | CONTENTS |
| --- | --- |
| DATA #0 | 「#」 |
| DATA #1 | 「*」 |
| DATA #2 | PROGRAM BROADCAST DATE, MONTH 10'S POSITION |
| DATA #3 | PROGRAM BROADCAST DATE, MONTH 1'S POSITION |
| DATA #4 | PROGRAM BROADCAST DATE, DAY 10'S POSITION |
| DATA #5 | PROGRAM BROADCAST DATE, DAY 1'S POSITION |
| DATA #6 | PROGRAM START TIME, HOUR 10'S POSITION |
| DATA #7 | PROGRAM START TIME, HOUR 1'S POSITION |
| DATA #8 | PROGRAM START TIME, MINUTE 10'S POSITION |
| DATA #9 | PROGRAM START TIME, MINUTE 1'S POSITION |
| DATA #10 | PROGRAM END TIME, HOUR 10'S POSITION |
| DATA #11 | PROGRAM END TIME, HOUR 1'S POSITION |
| DATA #12 | PROGRAM END TIME, MINUTE 10'S POSITION |
| DATA #13 | PROGRAM END TIME, MINUTE 1'S POSITION |
| DATA #14 | BROADCAST CHANNEL, 100'S POSITION |
| DATA #15 | BROADCAST CHANNEL, 10'S POSITION |
| DATA #16 | BROADCAST CHANNEL, 1'S POSITION |

FIG.26

AUDIO CONTROL SIGNAL TRANSMISSION APPARATUS AND RECEPTION APPARTUS, CONTROL SYSTEM AND CONTROL METHOD USING AN AUDIO CONTROL SIGNAL, PROGRAM INFORMATION TRANSMISSION APPARATUS AND TRANSMISSION METHOD, AND PROGRAM RESERVATION APPARATUS AND PROGRAM RESERVATION METHOD

BACKGROUND OF THE INVENTION

1. Field of the Invention

The present invention relates to an audio control signal transmission apparatus and reception apparatus, control system and control method using an audio control signal, program information transmission apparatus and transmission method, and program reservation apparatus and program reservation method.

2. Description of the Prior Art

Conventionally, a television reception apparatus, a radio reception apparatus, a video tape recorder (VTR) having a television tuner mounted, and the like, have been controlled at a distance by using a remote controller based on infrared rays.

For example, in a video tape recorder (VTR) and a television reception apparatus having a timer reservation function, a recording reservation and a program reservation are carried out by operating the infrared-ray controller as follows.

(1) Set a timer at a reservation mode.
(2) Set a start week and day of the week.
(3) Set a start hour.
(4) Set a start minute.
(5) Set an end hour.
(6) Set an end minute.
(7) Set a channel to be reserved.
(8) Set a timer reservation.

Among the aforementioned procedure steps (1) and (8), the steps (2) to (7) are carried out by setting a numeric using an up switch and a down switch for incrementing or decrementing by 1 digit, or using an input apparatus such as a 10-key switch and a bar code. Moreover, when reserving a program which is broadcast at the same time every day or every week, the above reservation is proclaimed each time so as to repeatedly use the program reservation information.

In a television reception apparatus, radio reception apparatus, video tape recorder (VTR) having a television tuner mounted, and the like, in addition to a function for receiving and demodulating an audio signal, it is necessary to provide a function for receiving and demodulating a remote control signal from a remote controller using an infrared ray so as to enable remote control using the remote controller.

Moreover, for a recording reservation and a program reservation in a video tape recorder (VTR) and a television reception apparatus having a time reservation function, a user needs to enter a necessary information for setting the reservation by looking at a program table.

SUMMARY OF THE INVENTION

It is therefore a first object of the present invention to realize a control system for transmitting a control signal superimposed an audio signal and controlling at a distance an apparatus which can receive the signal and an apparatus connected to this apparatus; and to provide an audio control signal transmission apparatus and reception apparatus and an audio control signal based control system and control method.

A second object of the present invention is to provide a program information transmission apparatus and transmission method which can transmit a program information as an audio information signal together with an audio signal.

Yet another object of the present invention is to provide a program reservation apparatus and a program reservation method which enables to readily carry out a program reservation by using a program information indicated by an audio information signal fed together with an audio signal to be transmitted.

Still another object of the present invention is to, provide a program reservation apparatus and a program reservation method which enable to readily carry out a program reservation by using a program information indicated by an audio information signal recorded and reproduced together with an audio signal via a recording medium.

The audio control signal transmission apparatus according to the present invention includes a control instruction input means for specifying a control instruction to be transmitted; audio control signal generating means for generating an audio control signal corresponding to the control instruction specified by the control instruction input means; and signal output means for outputting the audio signal to be transmitted and the audio control signal generated by the audio control signal generating means; wherein the output means outputs an audio control signal corresponding to the control instruction and an audio signal.

Moreover, the audio control signal reception apparatus according to the present invention includes signal input means for extracting an audio control signal which has been fed together with an audio signal; control instruction determining means for determining a control instruction given as an audio control signal extracted by the signal input means; and control instruction output means for outputting the control instruction determined by the control instruction specifying means; wherein the control instruction output means outputs a control instruction corresponding to an audio control signal fed to the signal input means.

Moreover, the audio control signal reception apparatus according to the present invention includes signal input means for extracting an audio control signal which has been fed together with an audio signal; control instruction specifying means for specifying a control instruction given as an audio control signal extracted by the signal input means; and execution means to be controlled for executing the control instruction determined by the control instruction specifying means; wherein the execution means to be controlled is controlled by executing a control instruction corresponding to an audio control signal fed to the signal input means.

The audio control signal based control system according to the present invention includes: an audio control signal transmission apparatus for transmitting an audio control signal corresponding to a control instruction and an audio signal to be transmitted; and an apparatus to be controlled, which receives an audio control signal transmitted together with an audio signal from the audio control signal transmission apparatus and executes a control instruction given by the audio control signal received, wherein the apparatus to be controlled is controlled by a control instruction corresponding to an audio control signal transmitted from the audio control signal transmission apparatus.

Moreover, the audio control signal based control system according to the present invention includes: an audio control signal transmission apparatus for transmitting an audio control signal corresponding to a control instruction and an audio signal to be transmitted; an audio control signal reception apparatus which receives an audio control signal transmitted together with an audio signal from the audio control signal transmission apparatus and outputs as a sound wave a control instruction corresponding to the audio control signal; and an execution apparatus to be controlled for executing the control instruction outputted as a sound wave from this audio control signal reception apparatus; wherein the execution apparatus to be controlled is controlled by a control instruction corresponding to an audio control signal transmitted from the audio control signal transmission apparatus.

Furthermore, the audio control signal based control method according to the present invention includes: a step of generating an audio control signal corresponding to a control instruction determined; a step of transmitting the audio control signal together with an audio signal to be transmitted; a step of receiving the audio control signal together with the audio signal; a step of extracting the audio control signal received; and a step of executing a control instruction given by the audio control signal.

The program information transmission apparatus according to the present invention includes: program information input means for inputting a program information to be transmitted; audio information signal generating means for generating an audio information signal corresponding to a program information entered by the program information input means; signal multiplexing means for multiplexing an audio signal to be transmitted, with the audio information signal generated by the audio information signal generating means; and transmission means for transmitting the audio information signal and the audio signal which have been multiplexed by the signal multiplexing means, wherein a program information is transmitted as an audio information signal together with an audio signal. Moreover, the program information transmission method according to the present invention is characterized in that an audio information signal is generated according to a program information entered, and an audio signal to be transmitted is multiplexed with the audio information signal so as to be transmitted together with the audio signal. For example, the audio signal to be transmitted and the audio information signal corresponding to a program information are transmitted by way of time division. Alternatively, an audio information signal corresponding to the program information is superimposed on the audio signal to be transmitted. As the audio information signal corresponding to a program information, it is possible to transmit a program information by a DTMF signal string. Moreover, it is possible to transmit a program information by an audio information signal indicating a G code. Furthermore, it is possible to transmit a program information by a DTMF signal string indicating a G code.

Moreover, the program reservation apparatus according to the present invention includes: reception means for receiving an audio information signal indicating a program information transmitted together with an audio signal to be transmitted; program information specifying means for extracting the audio information signal received by the reception means and specifying a program information indicated by the audio information signal; program information storage means for storing the program information determined by the program information specifying means; control means for controlling the reception means; and input means for inputting a set information to the control means; wherein the control means, according to a reservation set information entered by the input means, by using a program information stored in the program information storage means, controls the reception means to reserve a program to be received and receive the program reserved. Furthermore, the program reservation method is characterized in that control is made to execute: a step of receiving a program information transmitted together with an audio signal to be transmitted; a step of specifying and storing a program information indicated by the audio information signal received; a step of using a program information stored, according to a reservation set information entered, and reserving a program to be received; and a step of receiving the program reserved.

Moreover, the program reservation apparatus according to the present invention includes: reception means for receiving an audio information signal indicating a program information transmitted together with an audio signal to be transmitted; recording/reproduction means for recording and reproducing via a recording medium the audio information signal together with the audio signal received by the reception means; program information specifying means for extracting the audio information signal reproduced by the recording/reproduction means, so as to determine a program information indicated by the audio information signal; program information storage means for storing the program information determined by the program information specifying means; control means for controlling the reception means; and input means for inputting a set information to the control means; wherein the control means, according to the reservation set information entered by the input means, by using a program information stored in the program information storage means, controls the reception means and the recording/reproduction means to reserve a program to be received and receive the program reserved. Furthermore, the program reservation method according to the present invention is characterized in that control is made so as to execute: a step of receiving a program information transmitted together with an audio signal to be transmitted; a step of recording/reproducing via a recording medium the audio information signal together with the audio signal received; a step of extracting the audio information signal reproduced so as to specify a program information indicated by the audio information signal; a step of storing the program specified; a step of using a program information stored, according to a reservation set information entered, so as to reserve a program to be received; and a step of receiving the program reserved.

BRIEF DESCRIPTION OF THE DRAWINGS

FIG. 13 shows a correspondence between control instructions for executing an operation control of a video/audio signal recording and reproducing apparatus and audio control signals.

FIG. 16 shows a correspondence between control instructions for executing a character display control of a television reception apparatus and audio control signals.

FIG. 26 shows a DTMF signal string used in a video recording system.

DETAILED DESCRIPTION OF PREFERRED EMBODIMENTS

Hereinafter, description will be directed to embodiments of the present invention with reference to the attached drawings.

Figure 1:
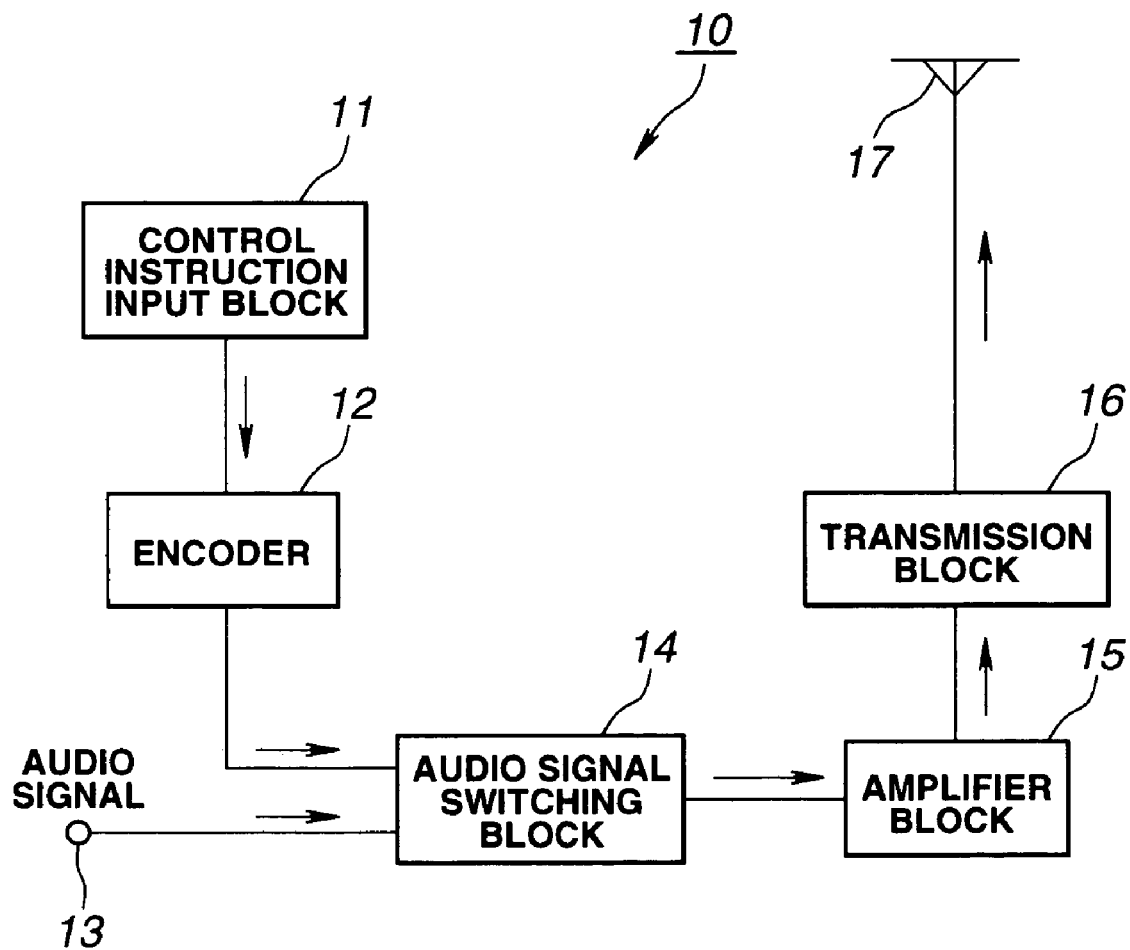
FIG. 1 is block diagram showing a configuration of an audio control signal transmission apparatus according to the present invention.

FIG. 1 is a block diagram showing an example of an audio control signal transmission apparatus according to a first embodiment of the present invention.

The audio control signal transmission apparatus shown in FIG. 1 includes: a control instruction input block 11 which determines a control instruction to be transmitted; an encoder 12 connected to this control instruction input block 11; a signal switching block 14 having an input terminal 12 connected to the encoder 12; an amplifier block 15 connected to the signal switching block 14; and a transmission block 16 to which an output signal of the amplifier block 15 is fed.

In this audio control signal transmission apparatus 10, the control instruction input block 11 determines a control instruction to be transmitted and supplies the control instruction to the encoder 12. The encoder 12 creates an audio control signal according to the control instruction supplied from the control instruction input block 11 and supplies the created audio control signal to the signal switching block 14.

Figure 2:
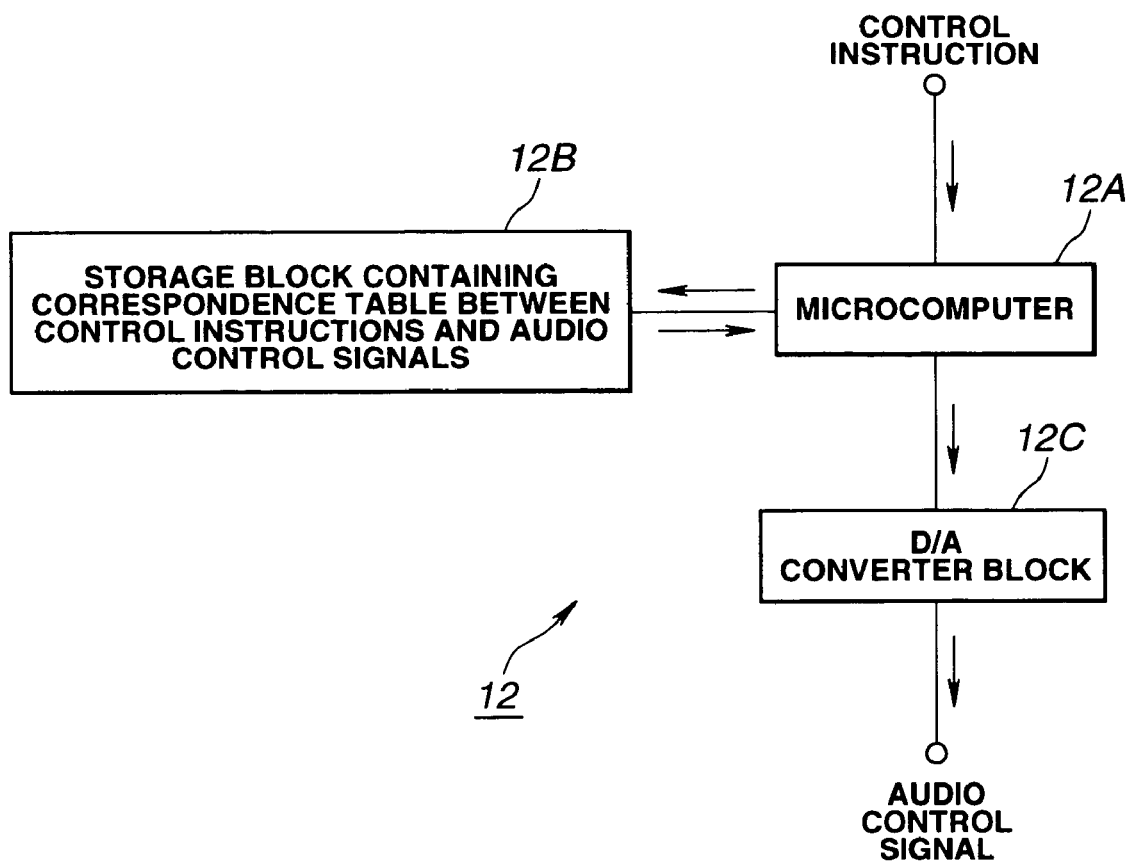
FIG. 2 is a block diagram showing a configuration of an encoder provided in the aforementioned audio control signal transmission apparatus.

Here, the encoder 12, as shown in FIG. 2, includes: a microcomputer 12A, a storage block 12B containing a correspondence table between control instructions and audio control signals; and a D/A converter block 12C which is supplied with an audio control signal information which is read out from the storage block 12B. In this encoder 12, the microcomputer 12A, according to a control instruction supplied from the control instruction input block 11, reads out an audio control signal information from the storage bloc 12B and supplies the information to the D/A converter block 12C. The D/A converter block 12C converts the audio control signal information read from the storage block 12B, into an analog signal so as to create an audio control signal and supplies the audio control signal to the signal switching block 14.

Moreover, the signal switching lock 14 is supplied via the input terminal 13 with an audio signal to be transmitted and switches this audio signal to the audio control signal created by the encoder 12 so as to supply the audio signal and the audio control signal as a time division multiplexed signal to the amplifier block 15. It should be noted that the audio signal includes signals of a frequency band which can be heard by a human and the audio control signal includes specific audio signals which are related with one-to-one correspondence to particular control instructions according to a predetermined rule. The amplifier block 15 amplifies the time division multiplexed signal supplied from the signal switching block 14, and supplies the amplified signal to the transmission block 16.

Furthermore, the transmission block 16 transmits the time division multiplexed signal which has been amplified by the amplifier block 15, i.e., the aforementioned audio signal and the audio control signal, as a radio wave via an antenna 17. It should be noted that in this embodiment, the signal is transmitted via an antenna but it can also be transmitted by using other transmission means such as a cable.

The audio control signal transmission apparatus 10 having the aforementioned configuration functions as an audio control signal transmission apparatus for transmitting via the antenna 17 as a radio wave an audio control signal and an audio signal which have been time division multiplexed according to a control instruction to be transmitted.

Figure 3:
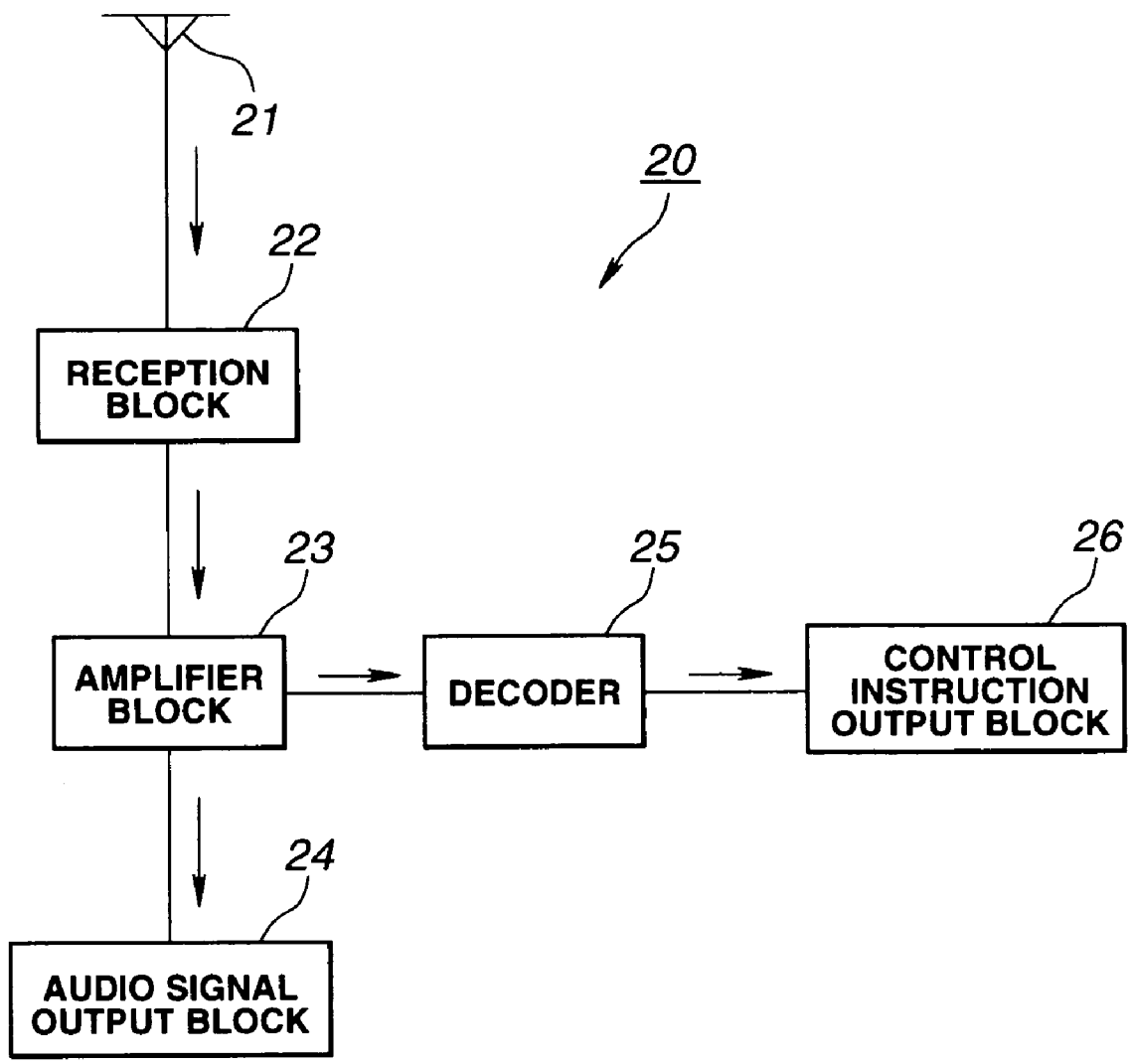
FIG. 3 is a block diagram showing a configuration of an audio control signal reception apparatus according to the present invention.

Next, FIG. 3 is a block diagram showing an example of an audio control signal reception apparatus according to the present invention.

The audio control signal reception apparatus 20 of FIG. 3 receives a time division multiplexed signal, i.e., an audio signal and an audio control signal transmitted as a radio wave from the aforementioned audio control signal transmission apparatus 10 of FIG. 1, and includes: a reception block 22 for receiving the aforementioned time division multiplexed signal via an antenna 21; an amplifier block 23 connected to this reception block 22; an audio signal output block 24 and a decoder 25 which are connected to this amplifier 24; a control instruction output block 26 connected to this decoder 25; and the like.

In this audio control signal reception apparatus 20, the reception block 22 demodulates an audio signal from the signal received via the antenna 21 and supplies the audio signal to the amplifier block 23. Moreover, the amplifier block 23 amplifies the audio signal which has been demodulated by the reception block 22 and supplies the amplified audio signal to the audio signal output block 24 and to the decoder 25.

The audio signal output block 24 includes a loud speaker for output of the audio signal which has been amplified by the amplifier block 23.

Moreover, the decoder 25 extracts from the audio signal amplified by the amplifier block 23, an audio control signal which is related with one-to-one correspondence to a control instruction, so as to identify a control instruction transmitted and supplies the control instruction to the control instruction output block 26. The control instruction output block 26 outputs the control instruction determined by the decoder 25.

Figure 4:
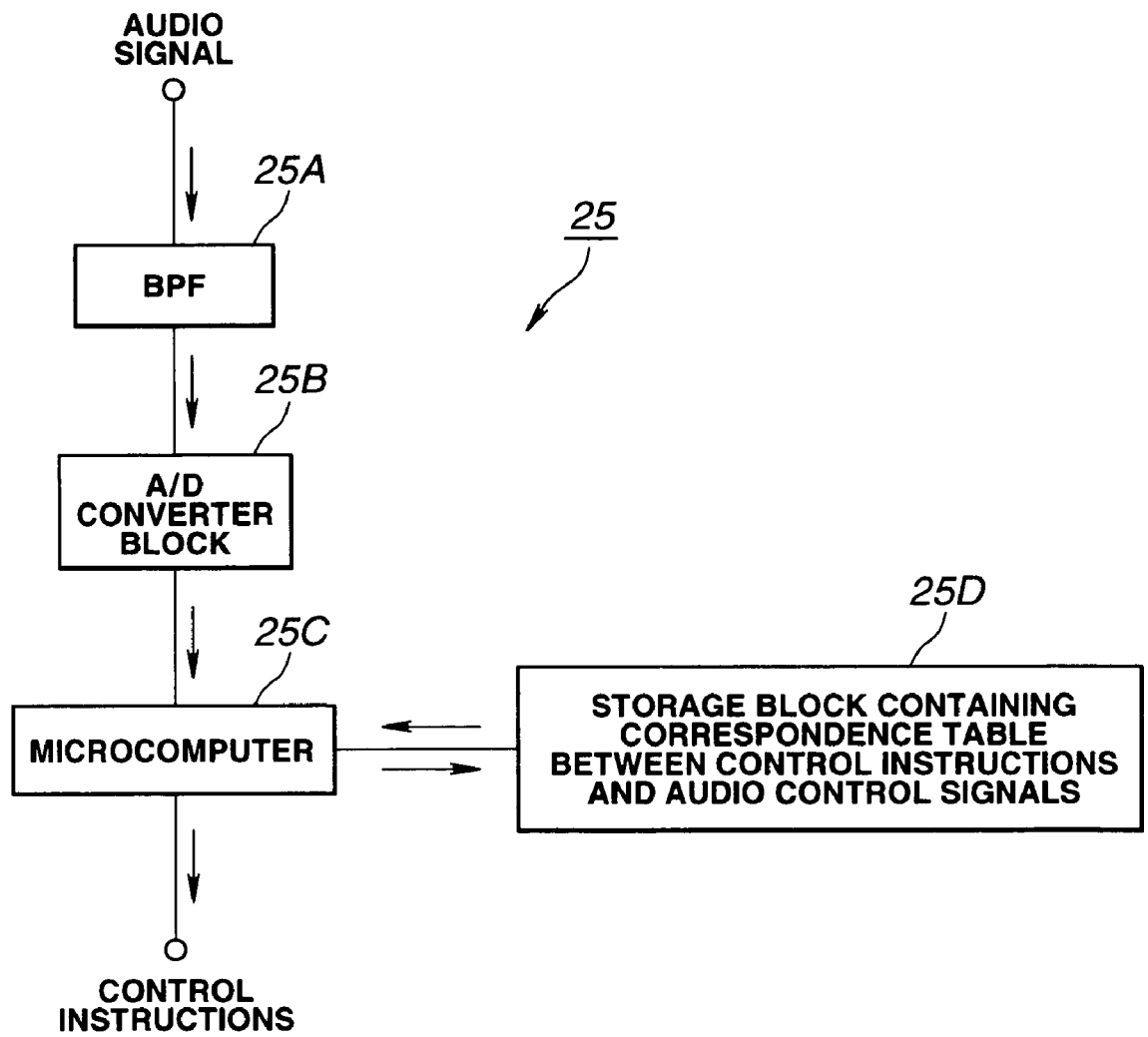
FIG. 4 is a block diagram showing a configuration of a decoder provided in the aforementioned audio control signal reception apparatus according to the present invention.

Here, the decoder, as shown in FIG. 4 for example, includes: a band pass filter 25A which is supplied with an audio signal which has been amplified by the amplifier block 23; an A/D converter which is supplied with an output signal of the band pass filter 25A; a microcomputer 25C supplied with an information as a digitized output signal of the band pass filter 25A which has been digitized by the A/D converter block 25B; a storage block 25D containing a correspondence table indicating correspondence between control instructions and audio control signals.

In this decoder 25, the band pass filter 25A allows to pass only an audio signal of a frequency band of an audio control signal and extracts from the audio signal amplified by the amplifier block 23 only an audio control signal for supply to the A/D converter block 25B. The A/D converter block 23B digitizes the audio control signal extracted by the band pass filter 25A and supplies an audio control signal information to the microcomputer 25C. The microcomputer 25C, according to the audio control signal information, references the correspondence table between control instructions and audio control signals stored in the storage block 25D and outputs a control instruction corresponding to the audio control signal.

By combining the aforementioned audio control signal transmission apparatus 10 and the audio control signal reception apparatus 20, it is possible to constitute a control system for transmitting a control instruction according to an audio control signal. In this case, it is possible to carry out an audio signal switching in the signal switching block 14 of the audio control signal transmission apparatus 10 in an extremely short period of time or to carry out switching according to a waveform of an audio signal inputted so that the audio control signal is hardly heard by the human ear.

It should be noted that instead of transmitting the audio signal and the audio control signal as a radio wave, it is also possible to transmit the audio signal and the audio control signal via a signal transmission path.

Figure 5:
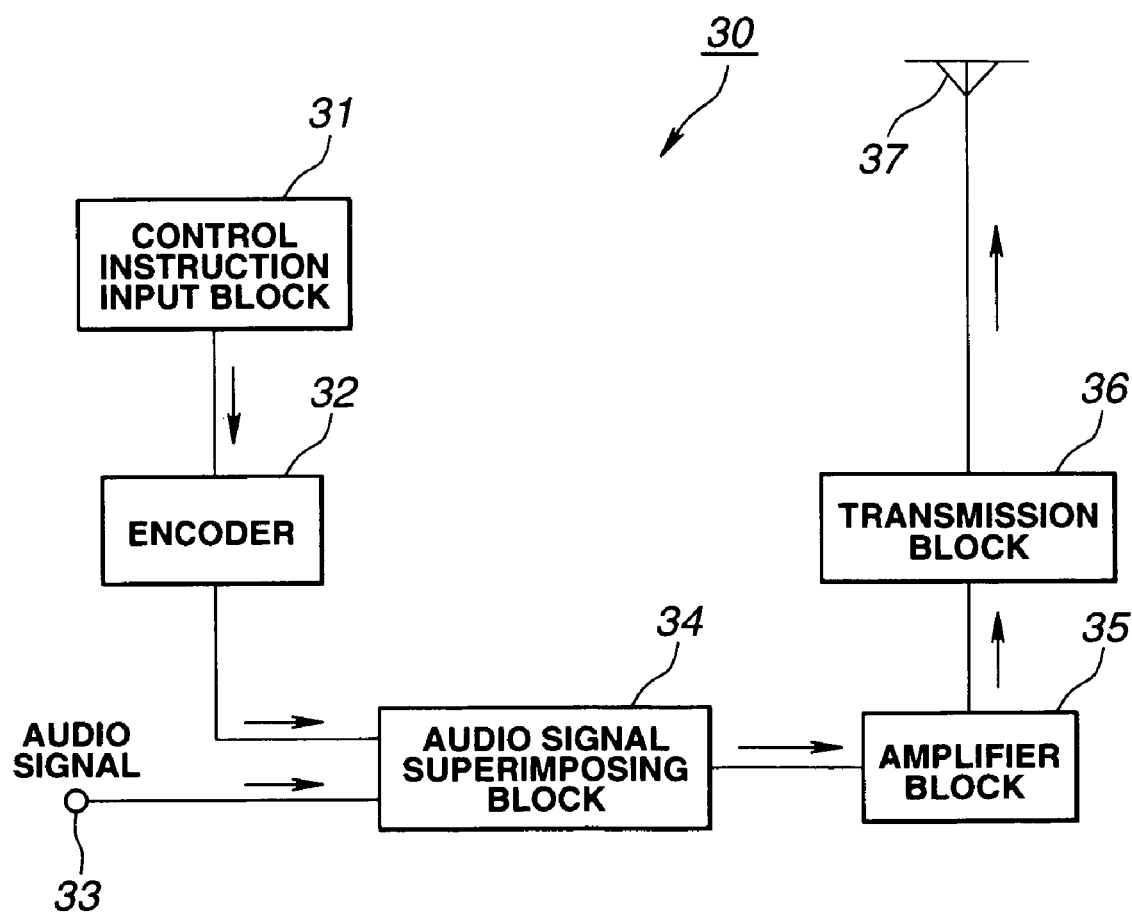
FIG. 5 is a block diagram showing another configuration of the audio control signal transmission apparatus according to the present invention.

Moreover, FIG. 5 is a block diagram showing an audio control signal transmission apparatus according to another embodiment of the present invention.

The audio control signal transmission apparatus 30 shown in FIG. 5 includes: a control instruction input block 31 which determines a control instruction to be transmitted; an encoder 32 connected to this control instruction input block 31; an audio signal superimposing block 34 connected to the encoder 32 and an input terminal 33; an amplifier block 35 connected to this audio signal superimposing block 34; a transmission block 36 supplied with an output signal of the amplifier block 35; and the like.

In this audio control signal transmission apparatus 30, the encoder 32 generates an audio control signal corresponding to a control instruction determined to be transmitted by the control instruction input block 31 and supplies the generated audio control signal to the audio signal superimposing block 34. The audio signal superimposing block 34 is supplied via the input terminal 33 with an audio signal to be transmitted and superimposes on this audio signal the aforementioned audio control signal generated by the encoder 32 for supply to the amplifier block 35.

Moreover, the amplifier block 35 amplifies the audio signal superimposed with the audio control signal by the signal superimposing block 34 for supply to the transmission block 36.

Furthermore, the transmission block 36 transmits the audio signal amplified by the amplifier block 35, i.e., the audio signal superimposed by the audio control signal, as a radio wave via an antenna 37.

The audio control signal transmission apparatus 30 having the aforementioned configuration functions as an audio control signal transmission apparatus for transmitting an audio signal superimposed with an audio control signal corresponding to a control instruction to be transmitted, as a radio wave via the antenna 37.

In the control system for transmitting a control instruction by way of an audio control signal constituted by combination of the audio control signal transmission apparatus and the audio control signal reception apparatus according to the present invention, a control instruction to be transmitted is transmitted together with an audio (sound) signal. Consequently, the present invention can be applied to an apparatus having a function of receiving an audio signal such as a television reception apparatus, radio reception apparatus, video/audio signal reception/recording/reproduction apparatus, and the like. Moreover, it is possible not only to externally output a control instruction by way of an audio control signal transmitted but also to control the apparatus itself.

Figure 6:
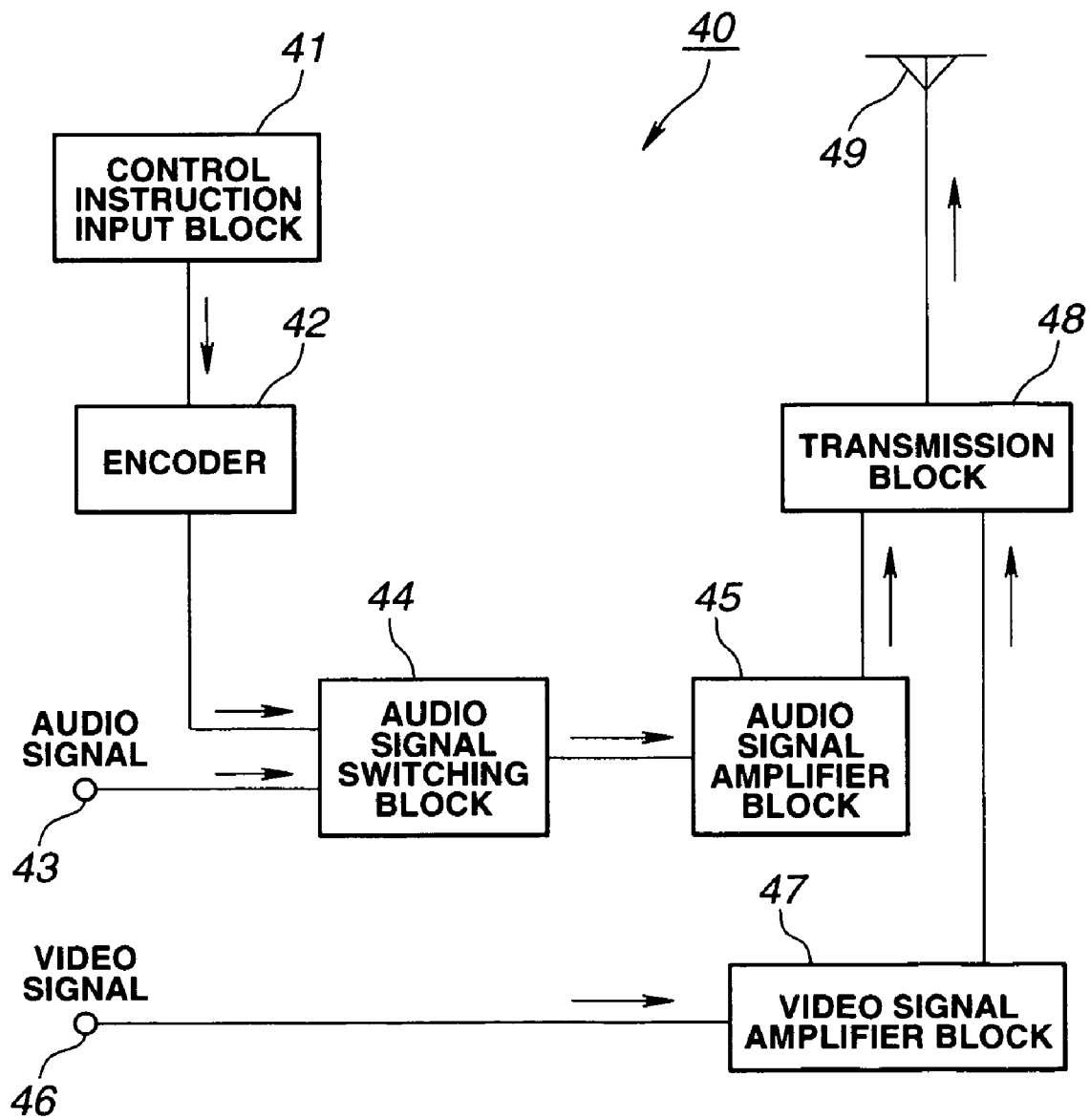
FIG. 6 is a block diagram showing a configuration example of a television transmission apparatus according to the present invention.

Moreover, FIG. 6 is a block diagram showing a configuration of a television transmission apparatus to which the present invention is applied.

The television transmission apparatus 40 shown in FIG. 6 includes: a control instruction input block 41 which determines a control instruction to be transmitted; an encoder 42 connected to this control instruction input block 41; a signal switching block 44 connected to this encoder 42 and to a sound signal input terminal 43; a sound signal amplifier block 45 connected to this signal switching block 44; a video signal amplifier 47 connected to a video signal input terminal 46; a transmission block 48 connected to the sound signal amplifier block 45 and to the video signal amplifier block 47; and the like.

In this television transmission apparatus 40, the encoder 42 generates an audio control signal corresponding to a control instruction determined to be transmitted by the control instruction input block 41 and supplies this audio control signal to the audio signal switching block 44. The signal switching block 44 is supplied via the audio signal input terminal 43 with a sound (audio) signal to be transmitted. This sound signal is superimposed by the aforementioned audio control signal generated by the encoder 42, so as to be supplied to the sound (audio) signal amplifier block 45. The sound signal amplifier block 45 amplifies the sound signal which has been imposed with the audio control signal by the signal switching block 44, and supplies the amplified signal to the transmission block 48. Moreover, the video signal amplifier block 47 amplifies a video signal supplied via a video signal input terminal 46 and supplies the amplified signal to the transmission block 48.

The transmission block 48 transmits via an antenna 49, the sound signal amplified by the sound signal amplifier block 45, i.e., the sound signal superimposed with the audio control signal and the video signal amplified by the video signal amplifier block 47, as a television signal.

The television transmission apparatus 40 having the aforementioned configuration can transmit a control instruction to be transmitted, by superimposing the control instruction signal on a sound signal which can be received by a television reception apparatus.

Figure 7:
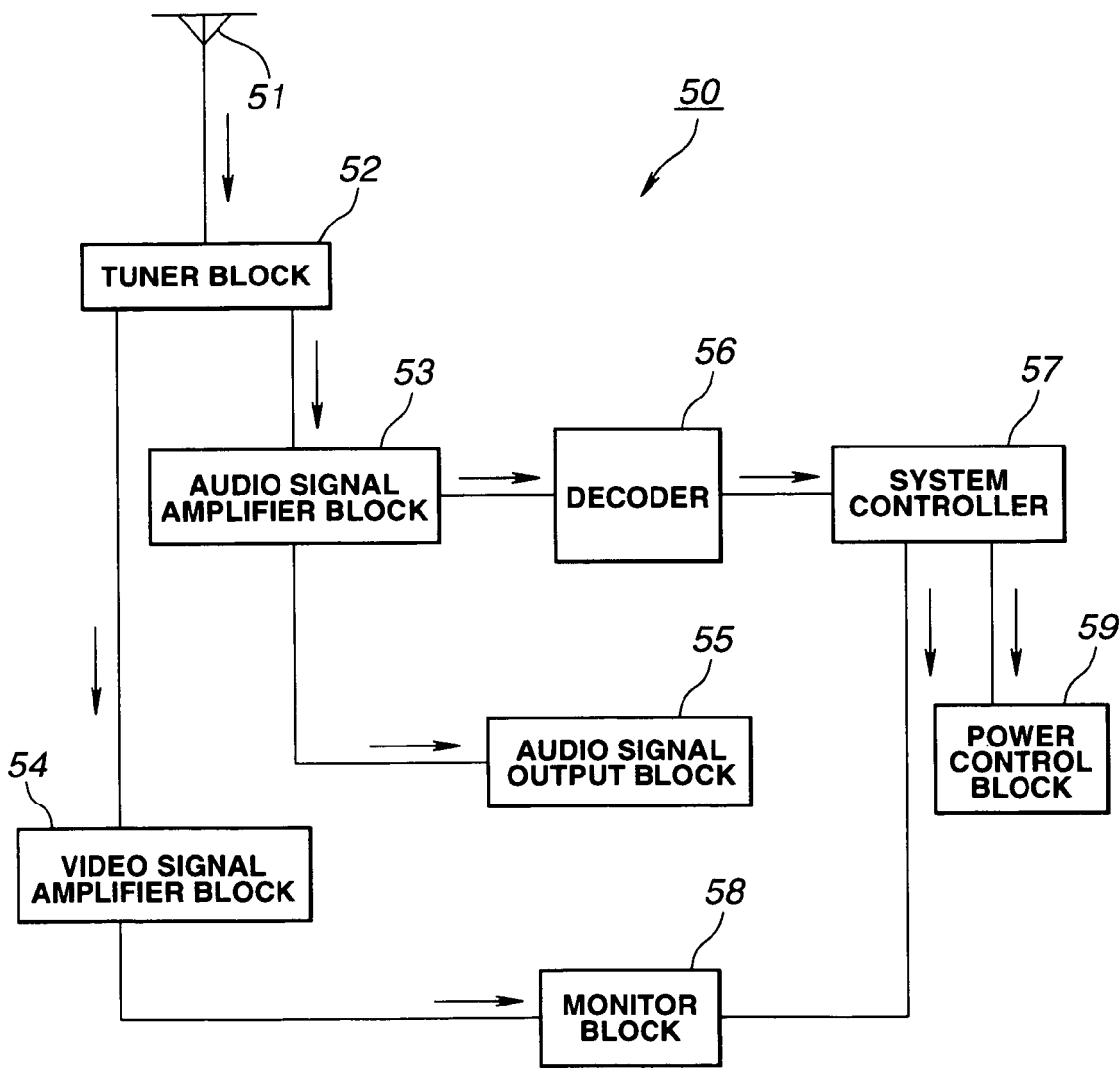
FIG. 7 is a block diagram showing a configuration example of a television reception apparatus according to the present invention.

FIG. 7 is a block diagram showing a configuration of a television reception apparatus which corresponds to the aforementioned television transmission apparatus.

The television reception apparatus 50 shown in FIG. 7 includes: a tuner block 52 for receiving the aforementioned television signal via an antenna 51; a sound signal amplifier block 53 and a video signal amplifier block 54 which are connected to this tuner block 52; a sound signal output block 55 and a decoder 56 which are connected to the sound signal amplifier block 53; a system controller 57 connected to this decoder 56; a monitor block 58 controlled by the system controller 57; a power control block 59; and the like.

In this television reception apparatus 50, the tuner block 52 demodulates a sound signal and a video signal from the television signal received via the antenna 51 and supplies the sound signal to the sound signal amplifier block 53 and the video signal to the video signal amplifier block 54.

The sound signal amplifier block 53 amplifies the sound signal which has been demodulated by the tuner block 52, and supplies the demodulated signal to the sound signal output block 55 and to the decoder 56.

The sound signal output block 55 outputs from a loud speaker the audio signal amplified by the sound signal amplifier block 53. Moreover, the decoder 56 extracts from the audio signal amplified by the audio signal amplifier block 53, an audio control signal related to a control instruction on one-to-one basis, so as to identify the control instruction transmitted and supplies the control instruction to the system controller 57. The system controller 57 executes the control instruction determined by the decoder 56 so as to control the monitor block 58 and the power control block 59 according to the control instruction.

Moreover, the video signal amplifier block 54 amplifies the video signal demodulated by the tuner block 52, for supply to the monitor block 58. The monitor block 58 excecutes a video display by the video signal amplified by the video signal amplifier block 54. Furthermore, the power control block 59 controls a power system of the entire apparatus.

The television reception apparatus 50 having the aforementioned configuration receives a television signal transmitted from the aforementioned television transmission apparatus 40 so as to obtain an audio output and a video output by the audio signal and the video signal and to execute a control instruction corresponding to an audio control signal superimposed on the aforementioned audio signal, thus enabling to control the monitor block 58 and the power control block 59.

That is, by combining the aforementioned television transmission apparatus 40 and the television reception apparatus 50, it is possible to constitute a control system using an audio control signal in which a control signal is superimposed as an audio control signal on an audio signal of a television signal transmitted by the television transmission apparatus 40, so as to control the television reception apparatus.

Here, in the aforementioned control system by an audio control signal constituted by the combination of the television transmission apparatus 40 and the television reception apparatus 50, instead of a time division transmission by switching between an audio signal and an audio control signal, it is possible to employ a method in which an audio signal is superimposed on an audio control signal for transmission and the reception side demodulates the modulates the audio signal so that the audio control signal is isolated from the demodulated audio signal.

It should be noted that it is possible to use any featured audio signal associated with a control instruction on one-to-one basis according to a predetermined rule, but it is preferable to use a signal which has a low possibility that an audio signal which is not an audio control signal is incorrectly identified as an audio control signal by the reception side.

As the audio control signal having such a low possibility of incorrect identification, for example, it is possible to use a DTMF (dual tone multi-frequency) signal string.

Figure 8:
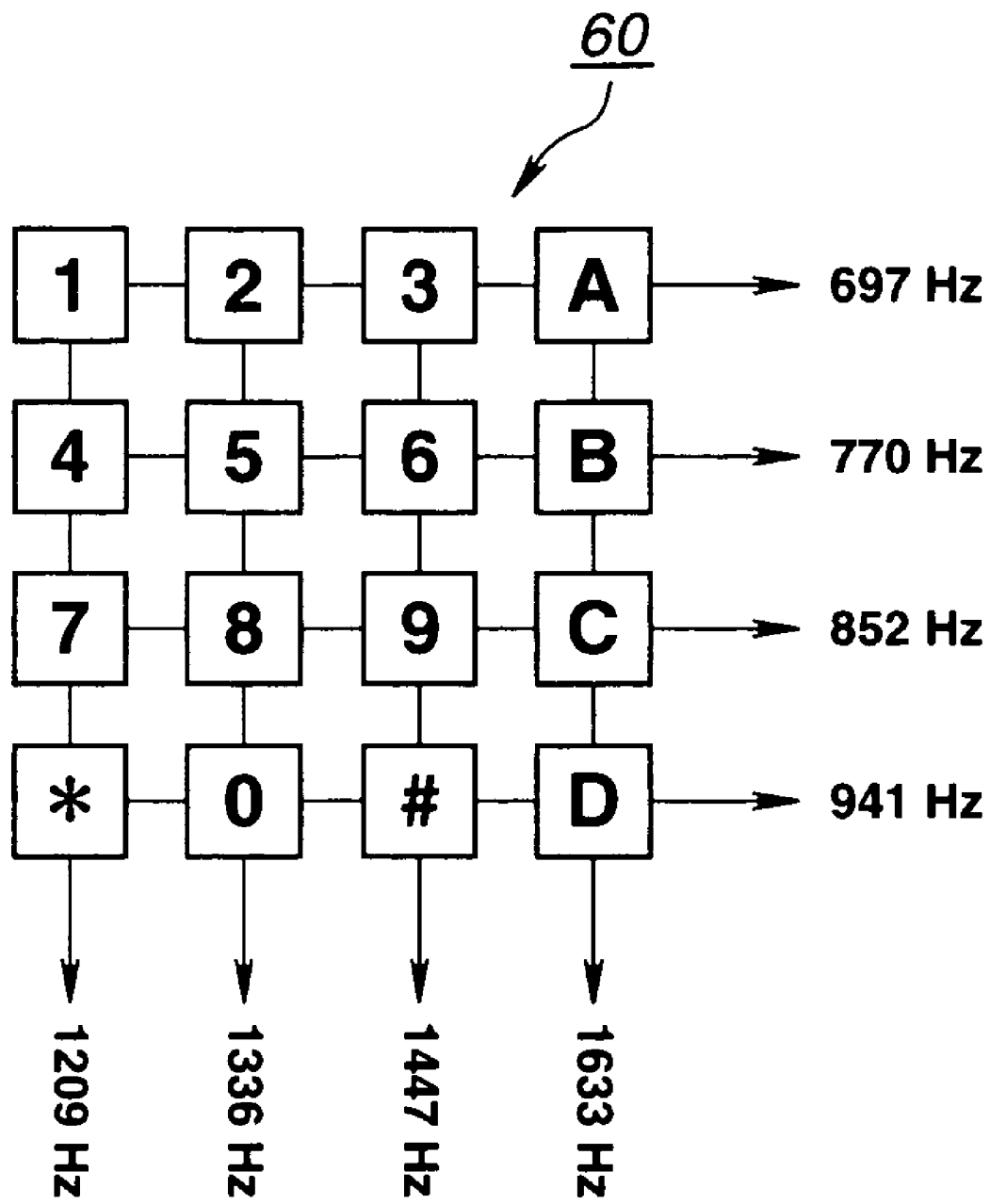
FIG. 8 shows nominal frequencies of a DTMF signal.

The DTMF signal is already used in practice for a telephone push line. As shown in FIG. 8, the DTMF signal is defined as 16 signals obtained by four audio signals, each having a different frequency: 697 Hz, 770 Hz, 852 Hz, and 941 Hz in combination with four audio signals, each having a different frequency: 1209 Hz, 1336 Hz, 1477 Hz, and 1633 Hz. A 16-pushbutton dial 60 is assigned for the 16 signals thus obtained.

That is, in the DTMF signal, for example, an audio signal of 1209 Hz superimposed by an audio signal of 697 Hz indicates "1".

A circuit for generating the DTMF signal is available as an integrated circuit of DTMF tone encoder. For example, if "1" is entered, the DTMF encoder outputs an audio signal of 1209 Hz superimposed on an audio signal of 697 Hz. Moreover, a circuit for extracting a DTMF signal from an input audio signal is available on the market as an integrated circuit fDTMF tone decoder. If an input audio signal contains both of the audio signal of 1209 Hz and the audio signal of 697 Hz, the DTMF tone decoder outputs "1".

Figure 9:
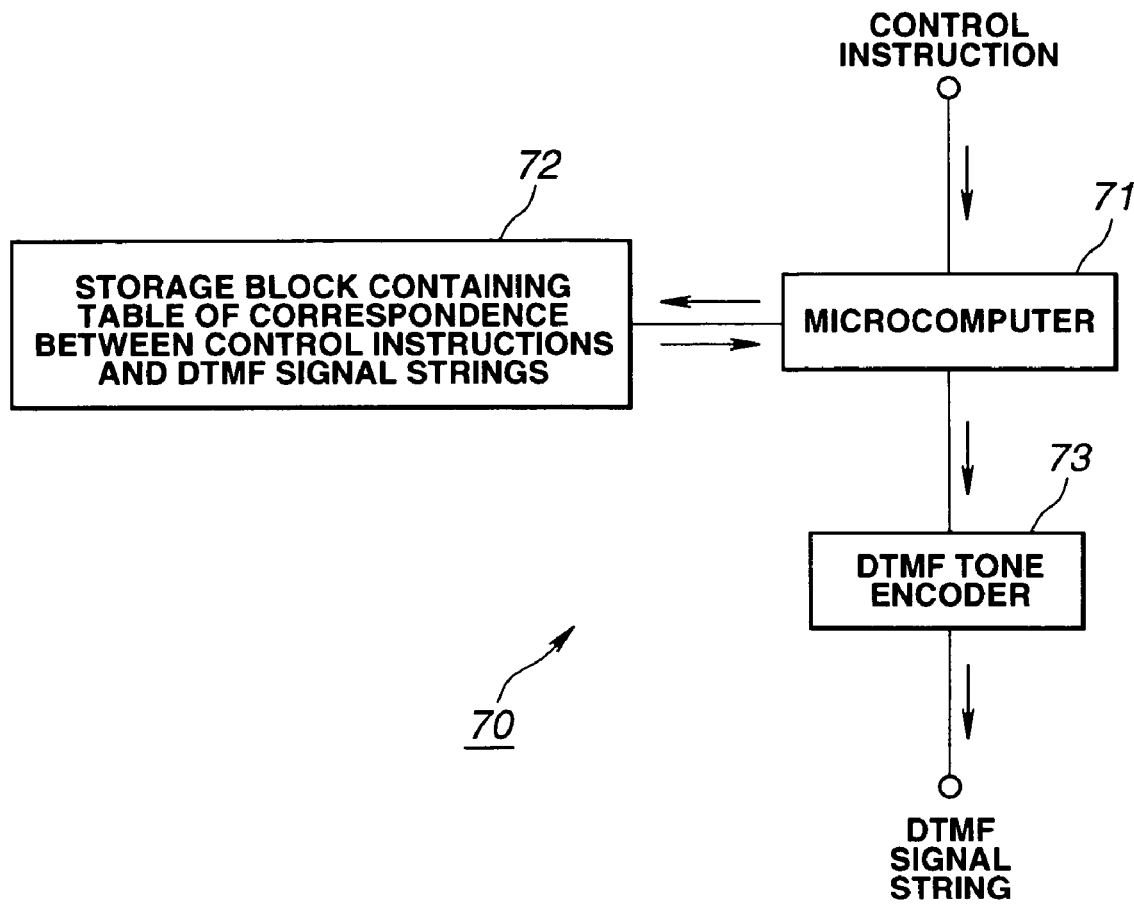
FIG. 9 is a block diagram showing a configuration of an encoder which outputs a DTMF signal string as an audio control signal according to a control instruction.

FIG. 9 is a block diagram showing a configuration of an encoder for generating a DTMF signal string as an audio control signal corresponding to a control instruction.

The encoder 70 shown in FIG. 9 includes: a microcomputer 71; a storage block 72 containing a table of correspondence between control instructions and DTMF signal strings; and a DTMF tone encoder 73.

In this encoder 70, the microcomputer 71, according to a control instruction inputted, references the table of correspondence between control instructions and DTMF signal strings stored in the storage block 72 and supplies to the DTMF tone encoder 73, a control information indicating a DTMF signal string corresponding to the control instruction inputted. The DTMF tone encoder 73, according to the control information supplied by the microcomputer 71, outputs a DTMF signal string corresponding to the control instruction.

By using the encoder 70 having the aforementioned configuration, it is possible to constitute an audio control signal transmission apparatus for transmitting a DTMF signal string as an audio control signal corresponding to a control instruction.

Figures 10, 11:
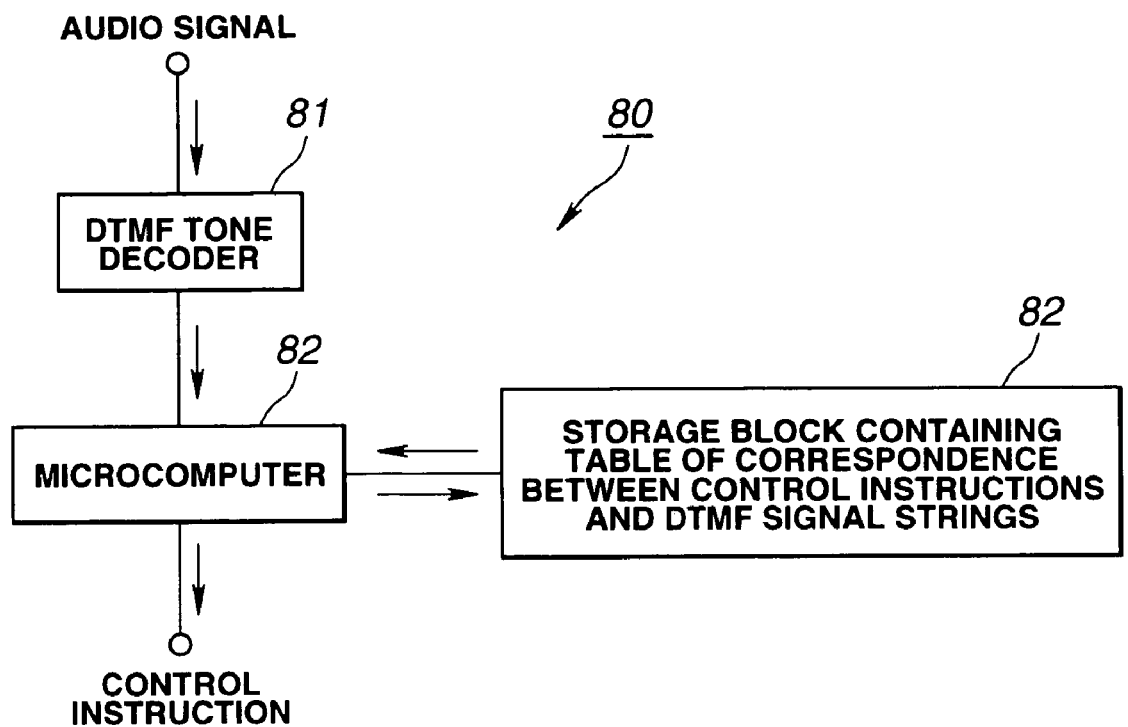
FIG. 10 is a block diagram showing a decoder configuration corresponding to an encoder which outputs a DTMF signal string as an audio control signal.
FIG. 11 shows a correspondence between control instructions for executing an operation control of a television reception apparatus and audio control signals.

Moreover, FIG. 10 is a block diagram showing a configuration f a decoder 80 which corresponds to the decoder 70 shown in FIG. 9.

The decoder 80 of FIG. 10 includes: a DTMF tone decoder 81; a microcomputer 82; and a storage block 83 containing a table of correspondence between control instructions and DTMF signal strings.

In this decoder 80, the DTMF tone decoder 81 analyzes frequency components contained in the audio signal inputted and supplies to the microcomputer 82 a decode information indicating a DTMF signal string inputted as the audio signal. The microcomputer 82, according to the decode information suppled from the DTMF tone decoder 81, references the table of correspondence between control instructions and DTMF signal strings stored in the storage block 83 and outputs a control instruction corresponding to the inputted DTMF signal string indicated by the aforementioned decode information.

By using the decoder 80 having the aforementioned configuration, it is possible to constitute an audio control signal reception apparatus for receiving a DTMF signal string as an audio control signal corresponding to a control instruction.

Consequently, by using the aforementioned encoder 70 as the aforementioned encoder 12, 32, 42 in the audio control signal transmission apparatus 10, 30 and the television transmission apparatus 40, and by using the aforementioned decoder 80 as the aforementioned decoder 25, 56 in the audio control signal reception apparatus 20 and the television reception apparatus 50, it is possible to constitute a control system using an audio control signal which can transmit a DTMF signal as an audio control signal so as to control the audio control signal reception apparatus 20 and the television reception apparatus 50.

Here, FIG. 11 shows an example of table of correspondence between control instructions for controlling the television reception apparatus 50 and audio control signals.

In the table of correspondence shown in FIG. 11, "video output off", i.e., a control instruction to inhibit a video output corresponds to a DTMF signal string of "1#". Moreover, "video output on", i.e., a control instruction to output a video corresponds to a DTMF signal string of "2#". Furthermore, "power off", i.e., a control instruction to turn off power corresponds to a DTMF signal string of "3#".

Consequently, by transmitting from the television transmission apparatus 40 a television signal containing the audio control signals, i.e., DTMF signal strings defined in the table of correspondence in FIG. 11, it is possible to control the television reception apparatus 50 as follows. If a television signal containing the DTMF signal of "1#" is received, the television reception apparatus 50 is controlled not to execute video output. Moreover, if a television signal containing the DTMF signal string of "2#" is received, the television reception apparatus 50 is controlled to output video. Furthermore, if a television signal containing the DTMF signal string of "3#" is received, the television reception apparatus 50 is controlled so as to turn off power of the entire apparatus.

It should be noted that FIG. 11 shows an example of table of correspondence between control instructions for controlling the television reception apparatus 50 and audio control signals, but any apparatus having an audio signal reception function such as a radio reception apparatus and a video/audio signal reception/recording/reproduction apparatus can be controlled according to a control instruction transmitted as an audio control signal.

Here, in the control system using an audio control signal constituted by combination of the aforementioned television transmission apparatus 40 and the television reception apparatus, instead of time division transmission by switchng between an audio signal to an audio control signal, it is possible to employ a method in which an audio signal is superimposed on an audio control signal so that the reception side can isolate/extract the audio control signal from the audio signal demodulated.

Moreover, an audio signal and an audio control signal need not be always transmitted as a radio wave but can be transmitted as a sound wave from a loud speaker so that an audio control signal is entered via a microphone to an apparatus to be controlled.

Figure 12:
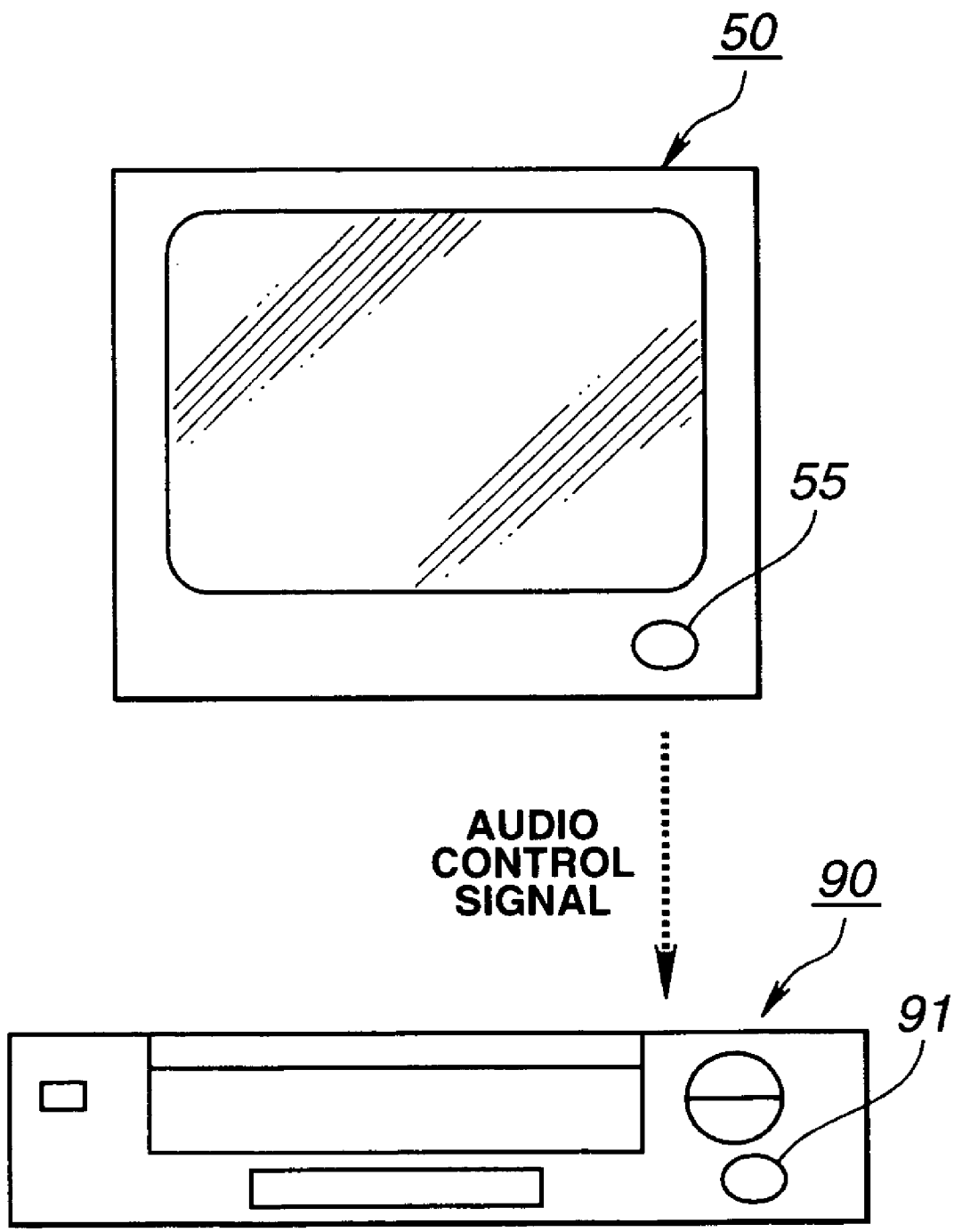
FIG. 12 shows a configuration of a control system for controlling operation of a video/audio signal recording and reproducing apparatus by way of audio output of a television reception apparatus.

For example, by superimposing on an audio signal to be transmitted, an audio control signal corresponding to a control instruction for controlling operation of a video/audio signal recording/reproduction apparatus, as shown in FIG. 12, it is possible to constitute a control system for controlling operation of the video/audio signal recording/reproduction apparatus via the television reception apparatus 50 which receives the aforementioned television signal.

In the control system shown in FIG. 12, the video/audio signal recording/reproduction apparatus 90 has the encoder 80 shown in FIG. 10 as a built-in component so that the audio control signal outputted together with the audio signal from the audio output block 55 of the television reception apparatus 50 is entered via a microphone 91 to the aforementioned encoder 80.

Here, a control instruction for controlling operation of the aforementioned video/audio signal recording/reproduction apparatus 90 may be Power ON, Power OFF, Stop, and the like which are assigned for the DTMF signals as shown in a table of correspondence between control instructions and audio control signals shown in FIG. 13.

In this control system, if the audio output block 55 of the aforementioned television reception apparatus 50 outputs an audio signal containing an audio control signal consisting of, for example, a DTMF signal string of "21#", the aforementioned video/audio signal recording/reproduction apparatus 90 executes a control instruction specified by the audio control signal so that an operation control is automatically carried out to turn on power corresponding to the DTMF signal string of "21#". Moreover, this video/audio signal recording/reproduction apparatus 90 executes a control instruction given by the audio control signal, so as to execute an operation control such as cutting off power corresponding to a DTMF signal string of "22#" and starting recording corresponding to a DTMF signal string of "23#".

Moreover, the aforementioned audio control signal can be used not only for giving an operation control instruction for controlling operation of an apparatus to be controlled but also for giving a character display control instruction for character display.

Figure 14:
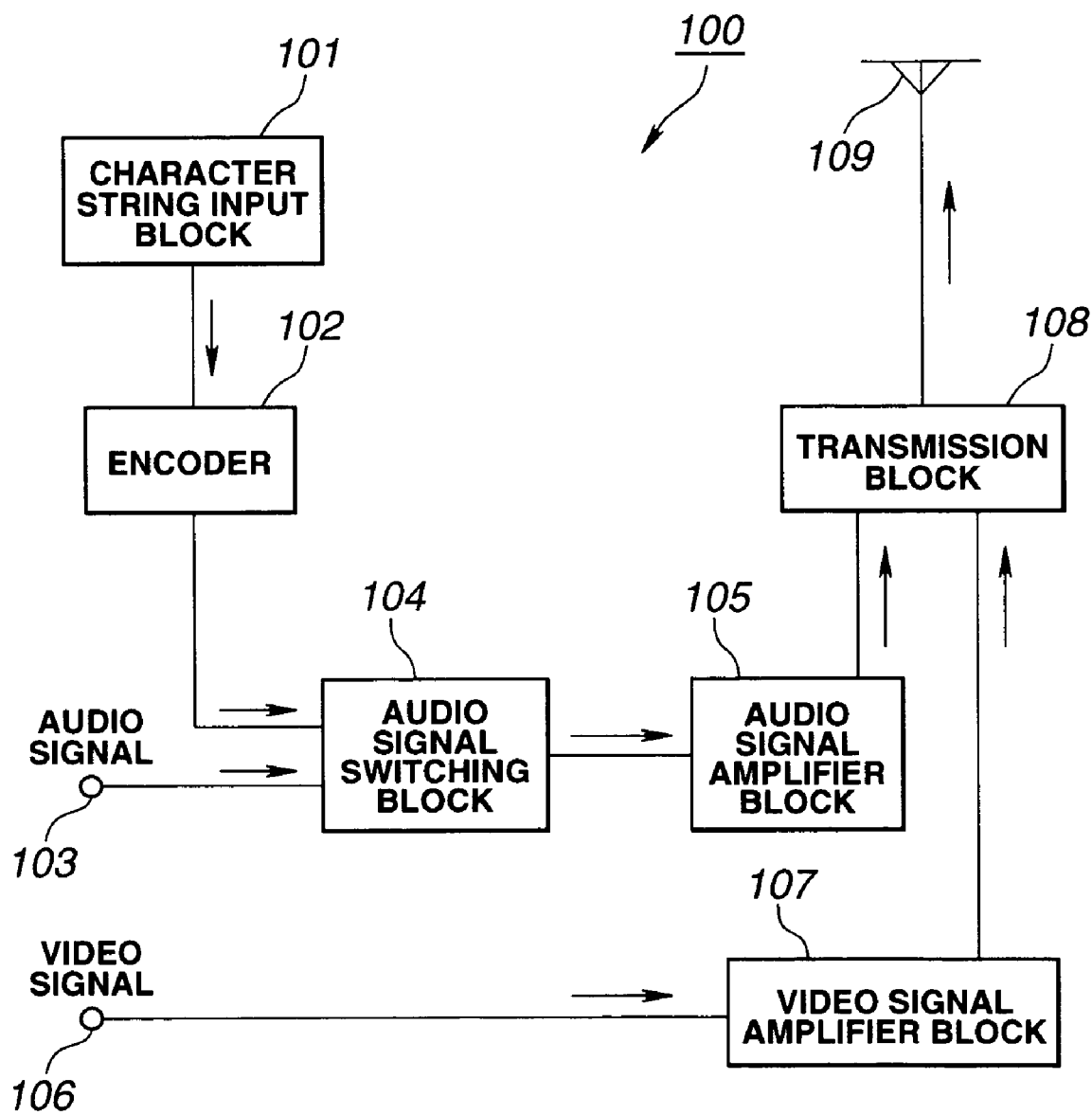

FIG. 14 is a block diagram showing a configuration of a television transmission apparatus for giving as an audio control signal, a character display control instruction for character display.

The television transmission apparatus 100 shown in FIG. 14 includes: a character information input block 101 for specifying a character information to be transmitted; an encoder connected to this character information input block 101; a signal switching block 104 connected to the encoder 102 and to an audio signal input terminal 103; an audio signal amplifier block 105 connected to this signal switching block 104; a video signal amplifier block 107 connected to a video signal input terminal 106; a transmission block 108 connected to the aforementioned audio signal amplifier block 105 and the video signal amplifier block 107; and the like.

In this television transmission apparatus 100, the encoder 102 generates an audio control signal corresponding to a character information determined to be transmitted by the character information input block 101, and supplies the audio control signal to the audio signal switching block 104. The aforementioned signal switching block 104 is supplied via the input terminal 103 with an audio signal to be transmitted, and superimposes on this audio signal the audio control signal generated by the encoder 102, so as to be supplied to the audio signal amplifier block 105. The audio signal amplifier 105 amplifies the audio signal superimposed with the audio control signal by the signal switching block 104, for supply to the transmission block 108. Moreover, the video signal amplifier block 107 amplifies a video signal supplied via the video signal input terminal 104, and transmits the amplified video signal to the transmission block 108.

The transmission block 108 transmits the audio signal amplified by the audio signal amplifier block 105, i.e., the audio signal superimposed with the audio control signal and the video signal amplified by the video signal amplifier block 107, as a television signal via an antenna 109.

In the television transmission apparatus 100 having the aforementioned configuration, it is possible to transmit a character information to be transmitted by superimposing the character information on an audio signal which can be received by a television reception apparatus.

Figure 15:
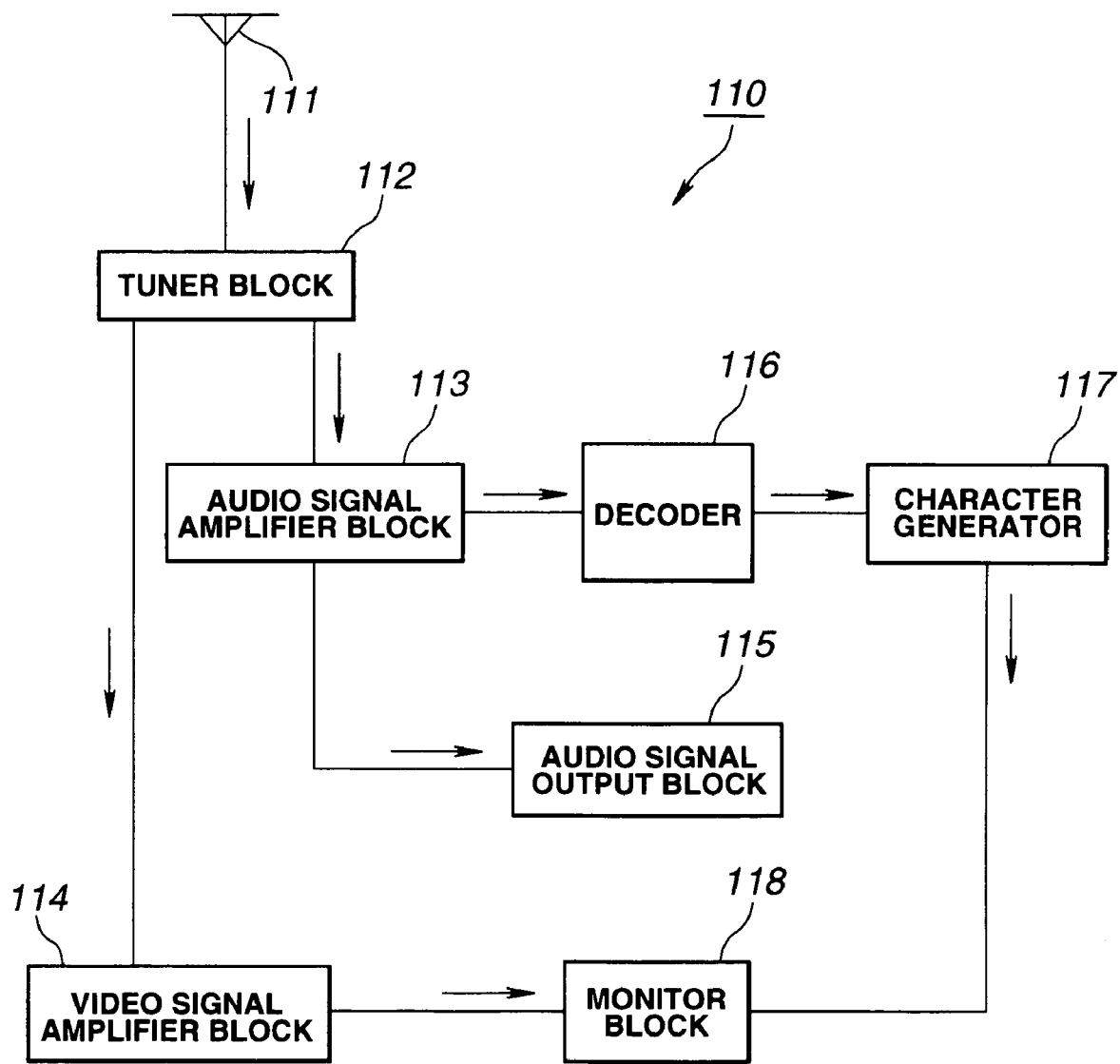
FIG. 15 is a block diagram showing another configuration example of a television reception apparatus according to the present invention.

FIG. 15 is a block diagram showing a configuration of a television reception apparatus 110 which corresponds to the aforementioned television transmission apparatus 100.

The television reception apparatus 110 shown n FIG. 15 includes: a tuner block 112 for receiving the aforementioned television signal via an antenna 111; an audio signal amplifier block 113 and a video signal amplifier block 114 which are connected to the tuner block 112; an audio signal output block 115 and a decoder 116 which are connected to the audio signal amplifier block 113; a character generator 117 connected to the decoder 116; a monitor block 118 supplied with an output of the video signal amplifier block 114 and an output of the character generator 117.

In this television reception apparatus 110, the tuner block 112 demodulates an audio signal and a video signal from the television signal received via the antenna 111, and supplies the audio signal to the audio signal amplifier block 113 and the video signal to the video signal amplifier block 114.

The audio signal amplifier block 113 amplifies the audio signal demodulated by the tuner block 112 and supplies the demodulated signal to the audio signal output block 115 and to the decoder 116.

The audio signal output block 115 outputs from a loud speaker the audio signal amplified by the audio signal amplifier block 113. Moreover, the decoder 116 extracts an audio control signal corresponding to a character information, from the audio signal amplified by the audio signal amplifier block 113, so as to identify a character information transmitted and supplies this character information to the character generator 117. The character generator 117 supplies to the monitor block 118, a character display signal for displaying the character information determined by the decoder 116.

Moreover, the video signal amplifier block 14 amplifies the video signal demodulated by the tuner block 112, for supply to the monitor block 118. The monitor block 118 executes an image display by the video signal amplified by the video siganl amplifier block 114 and executes a character display according to a character display signal supplied from the character generator 117, i.e., a screen display of the character information determined by the decoder 116.

Here, FIG. 16 shows an example of correspondence between character information items for displaying a character information by the television reception apparatus 100 and audio control signals.

In the table of correspondence shown in FIG. 16, a character information "A" corresponds to a DTMF signal string of "001#". Moreover, a character information "B" corresponds to a DTMF signal string of "002#". Furthermore, a character information "AB" corresponds to a DTMF signal string of "003#". As shown in FIG. 16, in the correspondence between character information items and audio control signals, one character need not correspond to one audio control signal. By relating a characer string which has a high transmission frequency to one audio control signal, it is possible to transmit a character information with a high efficiency.

The television reception apparatus 110 having the aforementioned configuration receives a television signal transmitted from the aforementioned television transmission apparatus 100, which enables not only to obtain a sound output and an image output according to the audio signal and the video signal but also to display on a screen by the monitor block 118 a character information corresponding to an audio control signal transmitted as superimposed on the aforementioned audio signal.

That is, by using the aforementioned television transmission apparatus 100 in combination with the television reception apparatus 110, it is possible to constitute a control system in which a character information is superimposed as an audio control signal on an audio signal of a television signal, so as to control to execute a character display by the television reception apparatus 110.

It should be noted that in a control system constituted by using the aforementioned television transmission apparatus 100 in combination with the television reception apparatus 110, instead of time division transmission by switching an audio signal to an audio control signal, it is possible to employ a method in which an audio signal is superimposed on an audio control signal for transmission so that the audio control signal is isolated/extracted from the audio signal demodulated by the reception side.

Figure 17:
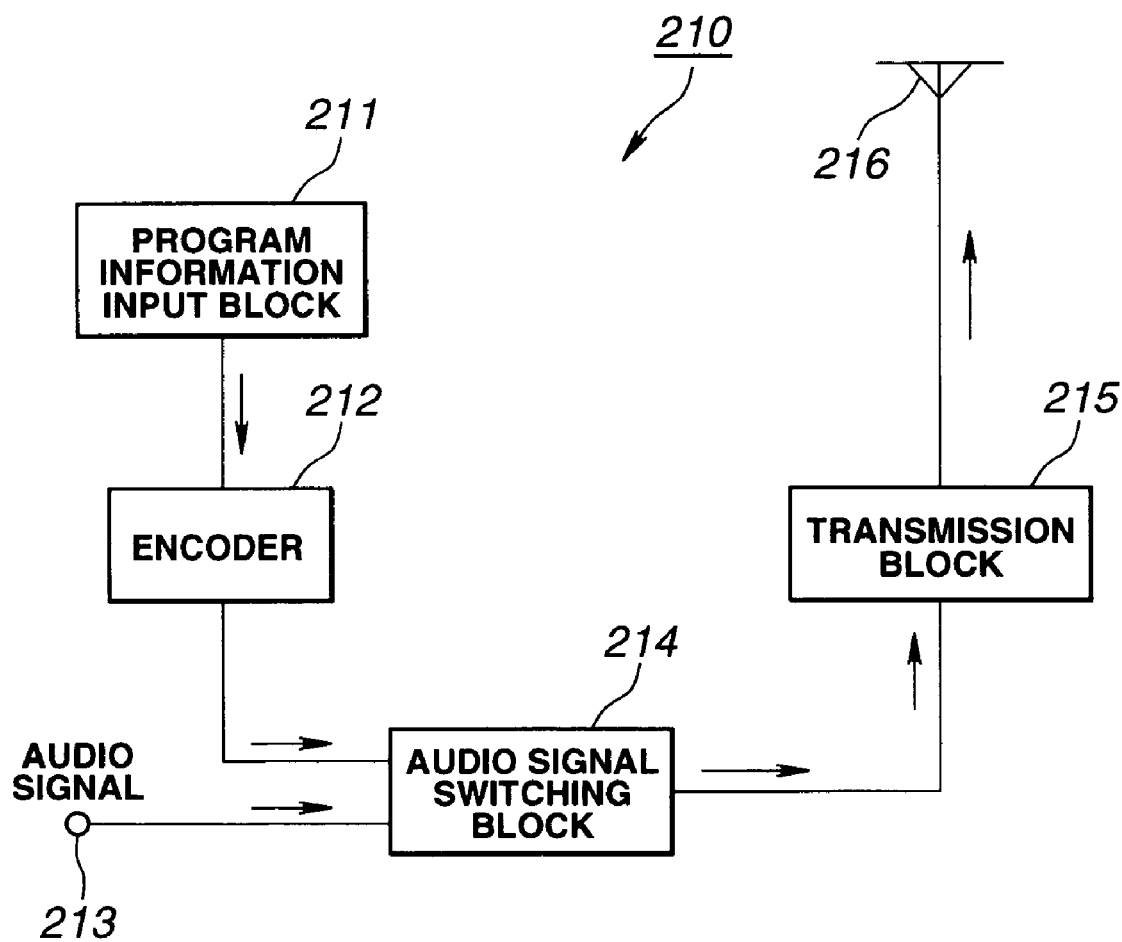
FIG. 17 is a block diagram showing an example of a program information transmission apparatus according to the present invention.

FIG. 17 is a block diagram showing an example of program information transmission apparatus according to another embodiment of the present invention.

The program information transmission apparatus 120 shown in FIG. 17 includes: a program information input block 211; an encoder 212 connected to this program information input block 211; a signal switching block 214 having an input terminal 213 connected to the encoder 212; a transmission block 215 connected to the signal switching block 214; and the like.

Figure 18:
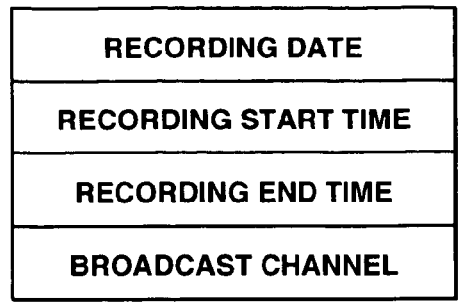
FIG. 18 shows program information items required for a program reservation at a reception side.

In this program information transmission apparatus 210, as shown in FIG. 18, the program information input block 211 supplies to the encoder 212 a program information including information required for a program reservation at a reception side including a broadcast date, broadcast start time, broadcast end time, broadcast channel, and the like.

Figure 19:
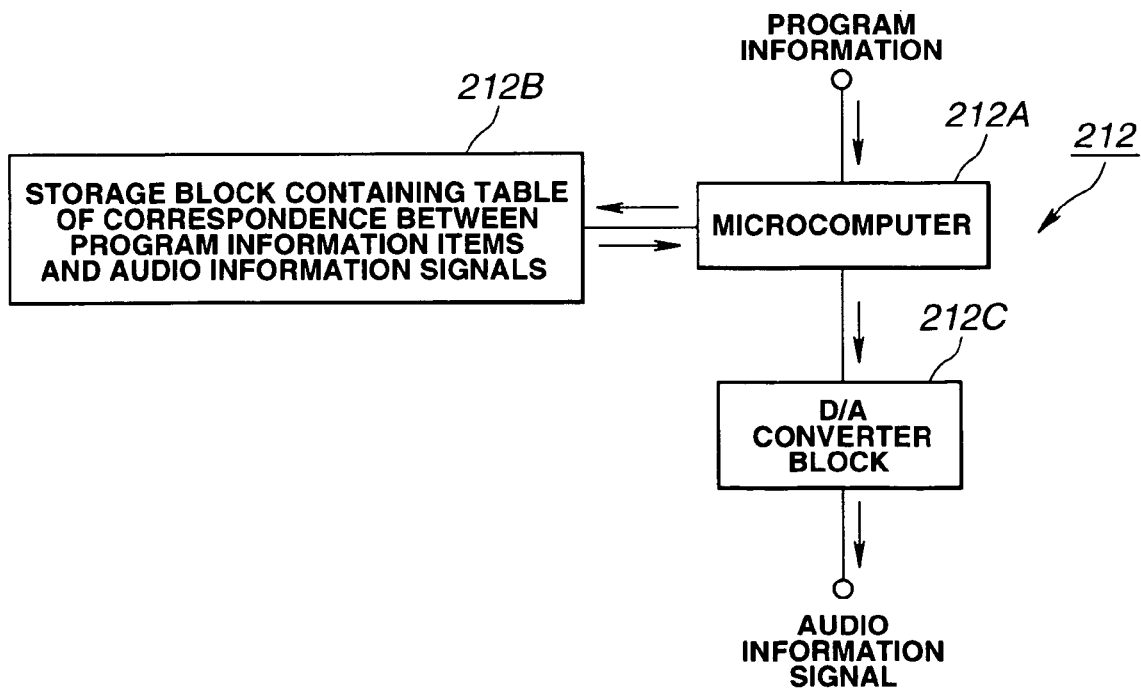
FIG. 19 is a block diagram showing a configuration of an encoder provided in the aforementioned program information transmission apparatus.

Here, the encoder 212, as shown in FIG. 19 for example, includes: a microcomputer 212A; a storage 212B containing a table of correspondence between program information items and audio information signals; and a D/A converter block 212C supplied with a digital signal of an audio information signal which is read out from the storage block 212B. In this encoder 212, the microcomputer 212A, according to an information supplied from the program information input block 211, reads out an audio information signal from the storage block 212B for supply to the D/A converter 212C. The D/A converter 212C converts the audio information signal read out from the storage block 212B, into an analog signal for supply to the signal switching block 214.

The signal switching block 214 is supplied via the input terminal 213 with an audio signal to be transmitted and switches this audio signal to the audio information signal generated by the encoder 212 so that the audio signal an the audio information signal are time-division multiplexed for supply to the transmission block 215. It should be noted that the audio signal is a signal of frequency band which can be heard by a human ear. Moreover, the audio information signal is a featured audio signal based on one-to-one correspondence with a program information according to a predetermined rule.

The aforementioned transmission block 215 transmits the time-division multiplexed signal, i.e., the audio signal and the audio information signal supplied from the signal switching block 214, as a radio wave via an antenna 216.

The program information transmission apparatus 210 having the aforementioned configuration serves as a radio broadcast apparatus which transmits an audio information signal indicating a program information and an audio signal which have been time-division multiplexed, as a radio wave via the antenna 216.

Figure 20:
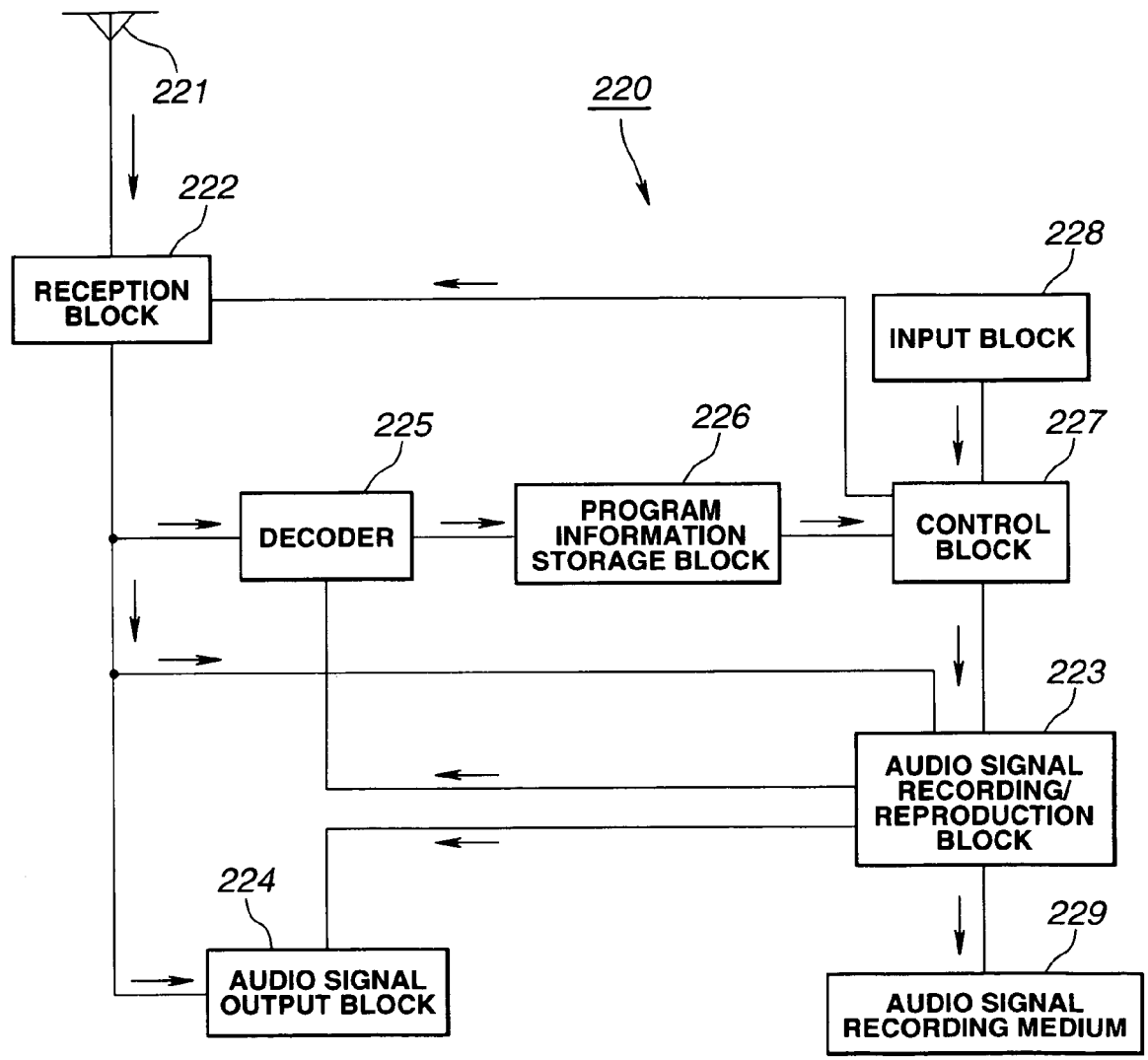
FIG. 20 is a block diagram showing an example of an audio signal reception/recording/reproduction apparatus according to the present invention.

Next, FIG. 20 is a block diagram showing an example of audio signal reception/recording/reproduction apparatus according to the present invention.

The audio signal reception/recording/reproduction apparatus 220 shown in FIG. 20 receives a time-division multiplexed signal, i.e., an audio signal and an audio information signal transmitted as a radio wave from the program information transmission apparatus 210 shown in FIG. 17, and includes: a reception block 222 for receiving the aforementioned time-division multiplexed signal via an antenna 221; an audio signal recording/reproduction block 223, an audio signal output block 224, and a decoder 225 which are connected to this reception block 222; a program information storage block 226 connected to this decoder 225; a control block 227 for controlling the reception block 222 and the audio signal recording/reproduction block 223; an input block 228 for giving a user set information to the control block 227; and the like.

In this audio signal reception/recording/reproduction apparatus 220, the reception block 222, according to a control instruction from the control block 227, demodulates an audio signal from the signal received via the antenna 221. The reception block 222 supplies the demodulated audio signal to the audio signal recording/reproduction block 223, the audio signal output block 224, and the decoder 225.

Moreover, the audio signal recording/reproduction block 223, according to a control instruction from the control block 227, records on a recording medium 229 an audio signal supplied from the reception block 222 or reproduces an audio signal from the recording medium 229 for supply to the audio signal output block 224.

Furthermore, the audio signal output block 224 includes a loud speaker and outputs an audio signal supplied from the reception block 222 or the audio signal recording/reproduction block 223.

Moreover, the decoder 225 extracts from the audio signal received by the reception block 222, an audio information signal related to a program information based on one-to-one correspondence, so as to identify a program information transmitted and supplies this program information to the program information storage block 226. The program information storage block 226 stores the program information determined by the decoder 225.

Furthermore, the control block 227 includes a microcomputer. According to a program reservation information entered through the input block 228, the control block 227 controls the reception block 222 and the audio signal recording/reproduction block 223 so as to carry out a program reservation based on a program information stored in the program information storage block 226 and record on the recording medium 229 an audio signal of the program reserved.

Figure 21:
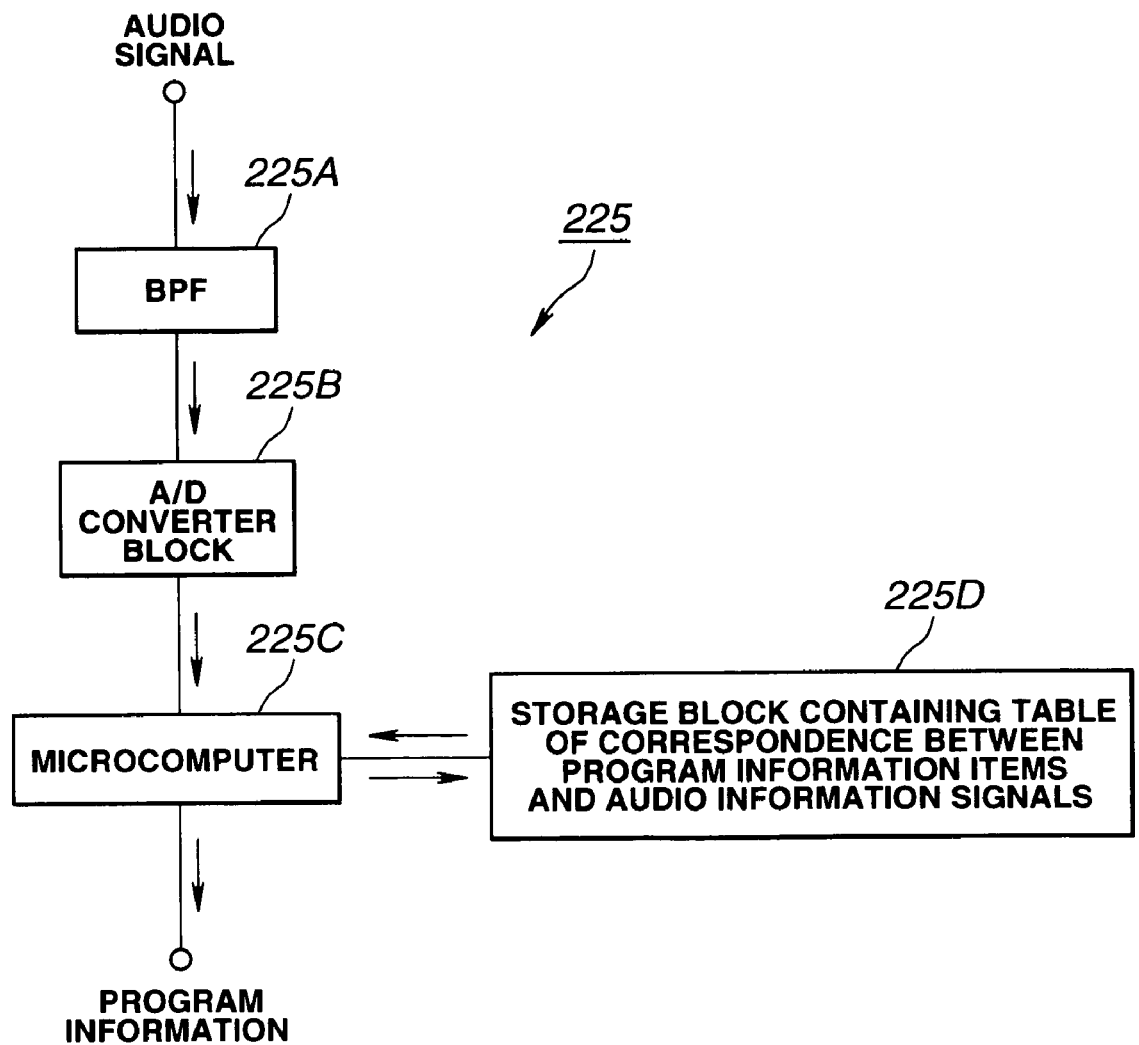
FIG. 21 is a block diagram showing a configuration of a decoder provided in the aforementioned audio signal reception/recording/reproduction apparatus.

Here, the decoder 225, as shown in FIG. 21 for example, includes: a band pass filter 225A supplied with an audio signal received by the reception block 222; an A/D converter block 225B which is supplied with an output signal of the band pass filter 225A; a microcomputer 225C which is supplied with an output signal of the band pass filter 225A which has been digitized by the A/D converter block 225B; and a storage block 225D containing a table of correspondence between program information and audio information signals.

In this decoder 225, the band pass filter 225A allows to pass only an audio signal having a frequency band of the audio information signal and extracts from the audio signal received by the reception block 222, an audio information signal for supply to the A/D converter block 225B. The A/D converter block 225B digitizes the audio information signal extracted by the band pass filter, for supply to the microcomputer 225C. The microcomputer 225C, according to the audio information signal, references the table of correspondence between program information and audio information signals stored in the storage block 225D and outputs a program information corresponding to the audio information signal.

By using the aforementioned program information transmission apparatus 210 in combination with the aforementioned audio signal reception/recording/reproduction apparatus 220, it is possible to constitute a program reservation system for carrying out a program reservation by transmitting a program information by way of an audio information signal. In this case, it is possible to carry out switching of an audio signal by the signal switching block 214 of the program information transmission apparatus 210 in an extremely short time or to carry out switching according to a waveform of an audio signal entered so that a program information signal is intentionally made difficult to be heard by a human ear.

It should be noted that instead of transmitting the audio signal and the audio information signal by air, it is also possible to transmit the audio signal and the audio information signal via a signal transmission path.

Moreover, in the audio signal reception/recording/reproduction apparatus 220 shown in FIG. 20, an audio signal received by the reception block 222 is supplied to the decoder so that the decoder 225 extracts an audio information signal so as to obtain a program information. Instead, it is also possible that an audio signal containing an audio information signal received by the reception block 222 is recorded on the recording medium 229 by the audio signal reception/recording/reproduction block 223 and an audio signal reproduced from the recording medium 229 is supplied to the decoder 225 so that the decoder 225 extracts an audio information signal so as to obtain a program information.

Next, explanation will be given on a video recording reservation system to which the present invention is applied.

Figure 22:
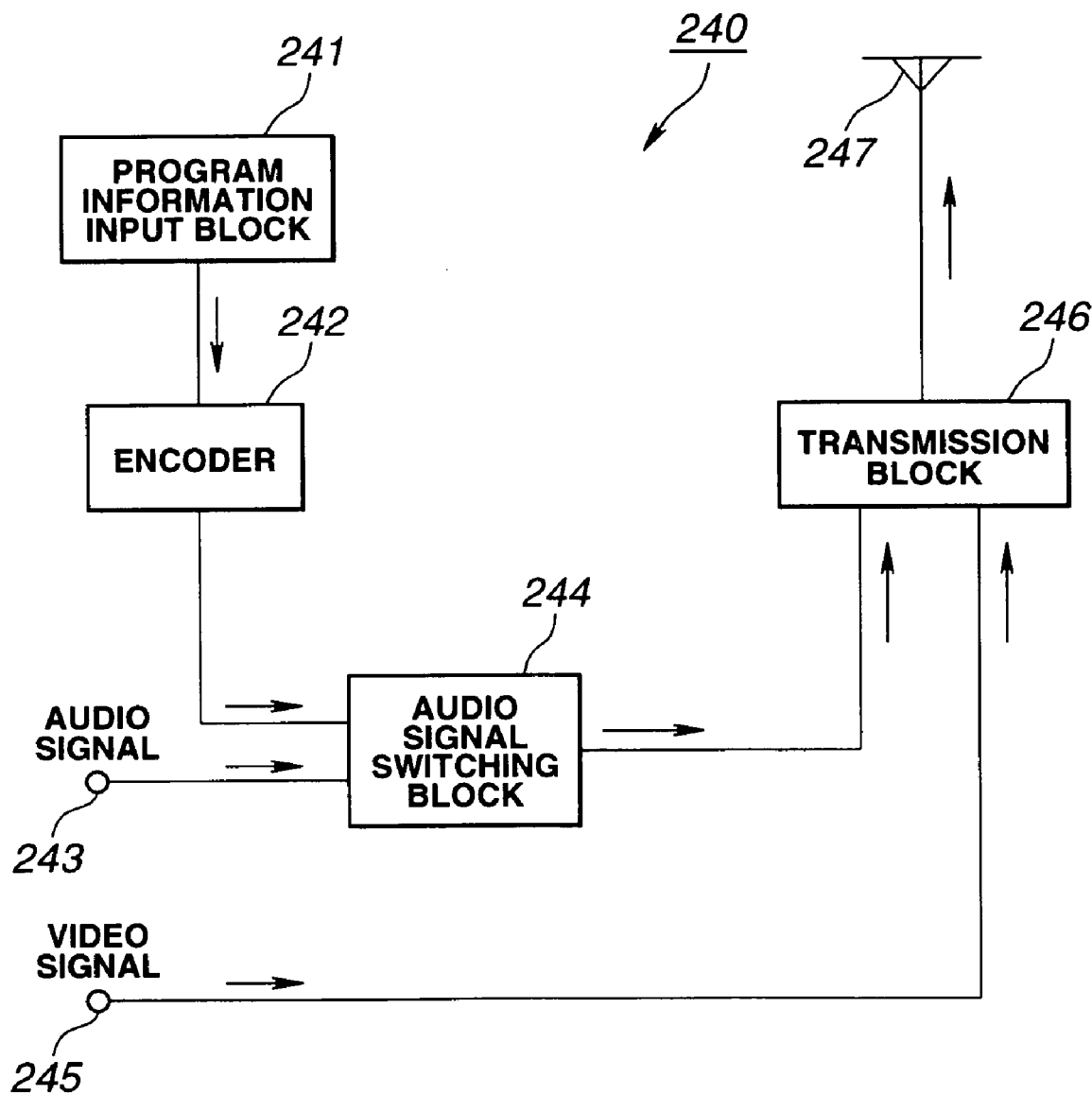
FIG. 22 is a block diagram showing a configuration example of a television transmission apparatus according to the present invention.
Figure 23:
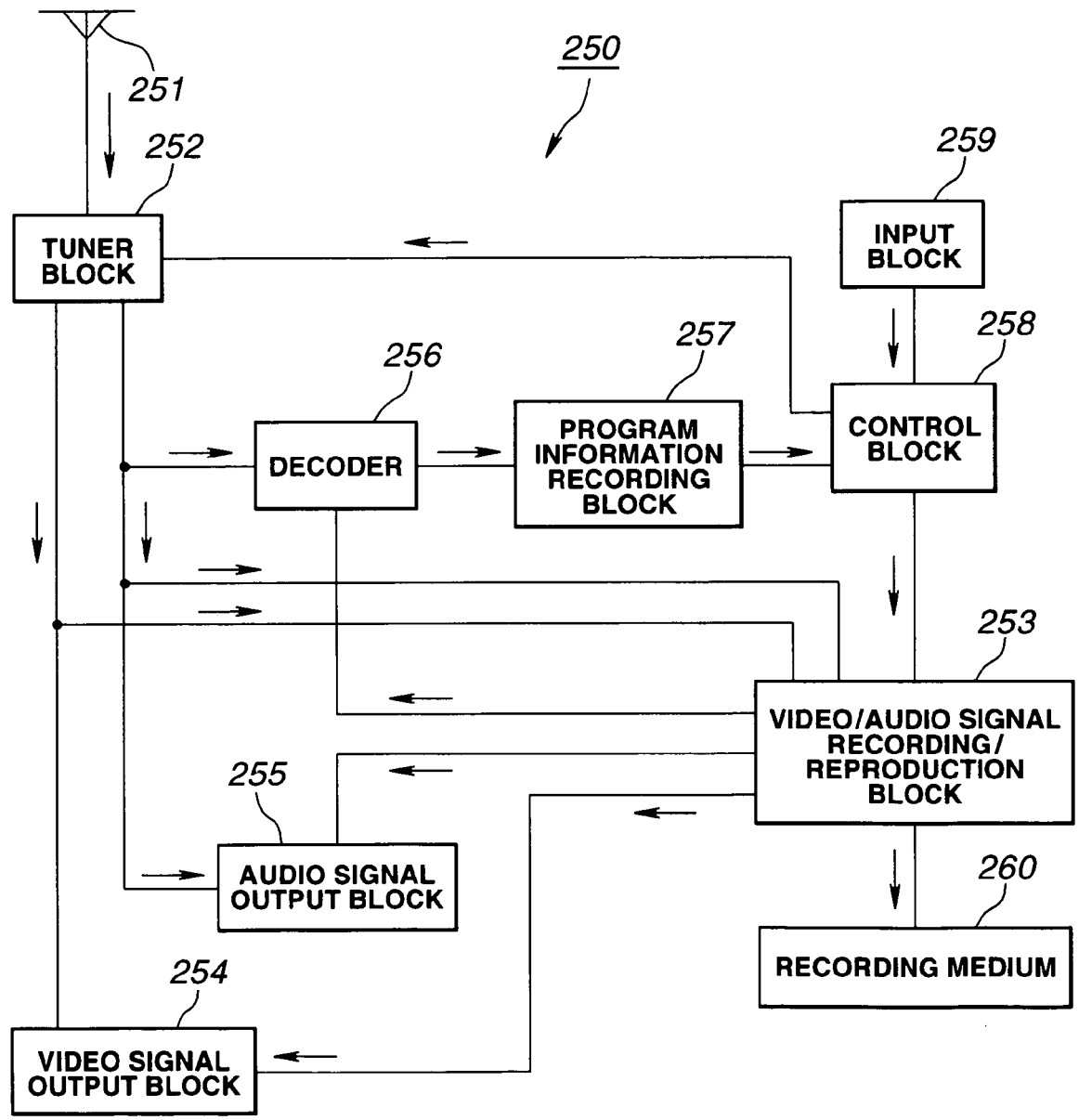
FIG. 23 is a block diagram showing a configuration example of a video deck according to the present invention.

This video recording system is constituted by a television broadcast apparatus 240 having a configuration shown in FIG. 22 and a video deck 250 having a configuration shown in FIG. 23.

The television transmission apparatus 240 shown in FIG. 22 to which the program information transmission apparatus according to the present invention is applied includes: a program information input block 241; an encoder 242 connected to this program information input block 241; an audio signal switching block 244 connected to the encoder 242 and an audio signal input terminal 243; a transmission block 246 connected to the signal switching block 244 and a video signal input terminal 245; and the like.

In this television transmission apparatus 240, the encoder 242 generates an audio information signal corresponding to a program information supplied from the program information input block 241 and supplies the audio information signal to the audio signal switching block 244. The audio signal switching lock 244 is supplied via the audio signal input terminal 243 with an audio siganl to be transmitted and superimposes on this audio signal the audio information signal generated by the encoder 242 for supply to the transmission block 246.

The transmission block 246 transmits a video signal supplied via the video signal input terminal 244 and the audio signal superimposed with the audio information signal by the audio signal switching block 244, as a television signal via an antenna 247.

The television transmission apparatus 240 having the aforementioned configuration can transmit a program information as an audio information signal superimposed on an audio signal which can be received by a television reception apparatus.

FIG. 23 is a block diagram showing a configuration of a video deck 250 on which a television tuner corresponding to the aforementioned television transmission apparatus 240 is mounted.

The video deck 250 shown in FIG. 23 includes: a tuner block 252 for receiving the aforementioned television signal via an antenna 251; a video/audio signal recording/reproduction block 253, a video signal output block 254, an audio signal output block 255, and a decoder 256 which are connected to the tuner 252; a program information storage block 257 connected to the decoder 256; a control block 258 for controlling the tuner block 252 and the video/audio signal recording/reproduction block 253; an input block 259 for supplying a user set information to the control block 258; and the like.

In this video deck 250, the tuner block 252, according to a control instruction from the control block 258, demodulates an audio signal and a video signal from the television signal received via the antenna 251. The video signal demodulated by this tuner block 252 is supplied to the video/audio signal recording/reproduction block 253 and, via the video signal output block 254, outputted externally. Moreover, the audio signal demodulated is supplied to the video/audio signal recording/reproduction block 253 and to the decoder 256, and outputted externally via the audio signal output block 255.

Moreover, the vide/audio signal recording/reproduction block 253, according to a control instruction from the control block 258, records on a recording medium 160 a video signal and an audio signal supplied from the tuner block 252, or reproduces from the recording medium 160 a video signal and an audio signal and outputs the signals externally via the video signal output block 254 and the audio signal output block 255.

Moreover, the decoder 256 extracts from the audio signal demodulated by the tuner block 252, an audio information signal based on one-to-one correspondence with a program information, so as to identify a program information transmitted and supplies the program information to the program information storage block 257. The program information storage block 257 stores the program information determined by the decoder 256.

The control block 258 includes a microcomputer. According to a program reservation set information inputted from the input block 259 having an operation key or the like, the control block 258 controls the aforementioned tuner block 252 and the video/audio signal recording/reproduction block 253 to carry out a program reservation according to a program information stored in the program information storage block 257 and to record on the recording medium 259 an audio signal of the program reserved.

Here, in a video recording reservation system using an audio information signal constituted by using the aforementioned television transmission apparatus 240 in combination with the video deck 250, instead of time-division transmission by switching of an audio signal to an audio information signal, it is possible to employ the method in which an audio signal superimposed on an audio information signal is transmitted so that the audio information signal is isolated/extracted from the audio signal demodulated by the reception side.

It should be noted that the audio information signal may be any audio signal featured on one-to-one correspondence with a program information according to a predetermined rule. However, it is preferable to use a signal having a low possibility of incorrect identification of an audio signal other than an audio information signal as an audio information signal by the reception side.

As an audio information having a low possibility of the aforementioned incorrect identification, for example, it is possible to use a DTMF (dual tone multi-frequency) signal.

This DTMF signal is identical as the one shown in the aforementioned FIG. 8, and its explanation is omitted here.

Figure 24:
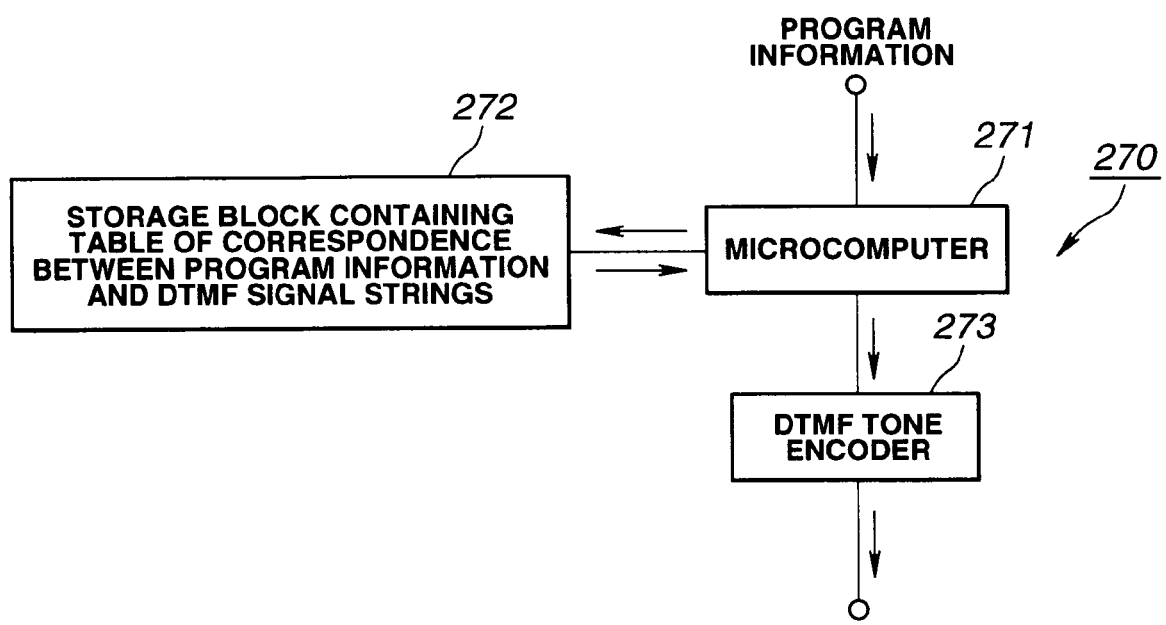
FIG. 24 is a block diagram showing a configuration of an encoder which outputs a DTMF signal string as an audio information signal according to a control instruction.

FIG. 24 is a block diagram showing a configuration of encoder for generating a DTMF signal string as an audio information signal corresponding to a program information.

The encoder 270 shown in FIG. 23 includes: a microcomputer 271; a storage block 272 containing a table of correspondence between program information items and DTMF signal strings; and a DTMF tone encoder 273. In this encoder 270, the microcomputer 271, according to a program information entered, references the table of correspondence between a program information and DTMF signal strings stored in the storage block 272 and supplies to the DTMF tone encoder 273, a control information indicating a DTMF signal string corresponding to the program information entered. The DTMF tone encoder 273, according to the control information given by the microcomputer 271, outputs a DTMF signal string corresponding to the program information.

By using the encoder 270 having the aforementioned configuration, it is possible to constitute a program information signal transmission apparatus for transmitting a DTMF signal string as an audio information signal corresponding to a program information.

Figure 25:
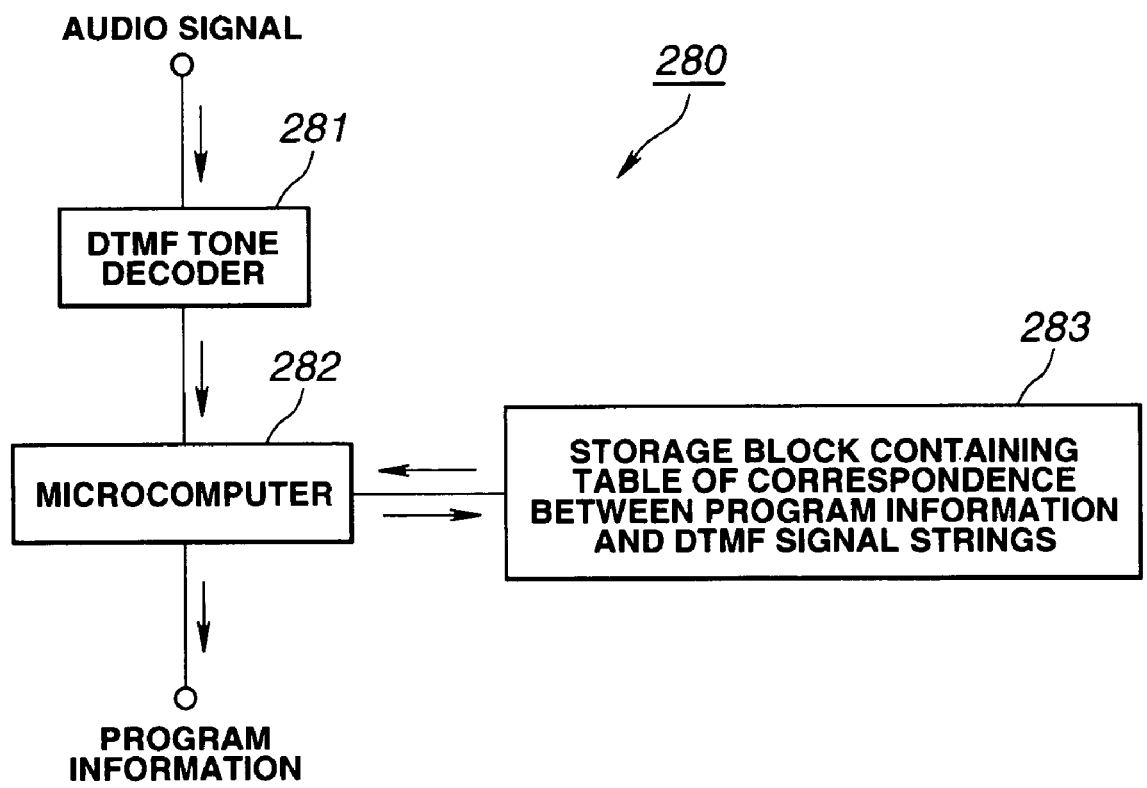
FIG. 25 is a block diagram showing a configuration of a decoder which corresponds to an encoder which outputs a DTMF signal string as an audio information signal.

Moreover, FIG. 25 is a block diagram showing a configuration of a decoder 280 which corresponds to the encoder 270 shown in the aforementioned FIG. 24.

The decoder 280 shown in FIG. 25 includes: a DTMF tone decoder 281; a microcomputer 282; and a storage block 283 containing a table of correspondence between program information items and DTMF signal strings.

In this decoder 280, the DTMF tone decoder 281 analyzes a frequency component contained in an audio signal entered and supplies to the microcomputer 282 a decode information indicating the DTMF signal string entered as the audio signal. The microcomputer 282, according to the decode information supplied from the DTMF tone decoder 281, references the table of correspondence between program information items and DTMF signal strings stored in the storage block 283 and outputs a program information corresponding to the DTMF signal string entered.

By using the decoder 280 having the aforementioned configuration, it is possible to constitute a program information signal reception apparatus for receiving a DTMF signal string as an audio information signal corresponding to a program information.

Consequently, by using the aforementioned encoder 270 as the encoder 242 in the aforementioned television transmission apparatus 240 in combination with the aforementioned decoder 280 as the decoder 256 in the aforementioned video deck 250, it is possible to constitute an audio information signal based program reservation system capable of transmitting a DTMF signal string as an audio information signal corresponding to a program information, so as to control the vide deck 250.

It should be noted that instead of transmitting a television signal containing the aforementioned audio information signal as a radio wave, it is possible to transmit the television signal via a signal transmission path.

Moreover, in this video recording reservation system, an audio signal received by the tuner block 252 of the video deck 250 is supplied to the decoder 256 so that the decoder 256 extracts an audio information signal to obtain a program information, but it is also possible that a video/audio signal containing an audio information signal received by the tuner block 252 is recorded in the recording medium 259 by the video/audio signal reception/recording/reproduction block 253 and an audio signal reproduced from this recording medium 259 is supplied to the decoder, so that the decoder extracts an audio information signal to obtain a program information.

Here, FIG. 26 shows an example of table of correspondence between a program information items and audio information signals for controlling the aforementioned video deck 250.

In this table of correspondence, "#" and "*" used as a header to identify an audio information signal superimposed on an audio signal are assigned for data #0 and data #1; data #6 to #9 are assigned for a program start time; and data #10 to #13 are assigned for a program end time. Furthermore, #14 to #16 are assigned for broadcast channels.

Consequently, for example, a program to be broadcast on March 30, from 12 o'clock 30 minutes to 14 o'clock 00 minutes at channel 12 constitutes a sound string of "#*033012301400012".

That is, the aforementioned television transmission apparatus 230 broadcasts a television signal containing an audio information signal indicating a sound string of "#*033012301400012" and the video deck 250 which has received the television broadcast can recognizes the audio information signal contained in the television signal as a program information for a program to be broadcast on March 30, from 12 o'clock 00 minute to 14 o'clock 00 minute, at channel 12. According to a program reservation set information entered from the input block, the aforementioned program information can be specified for video recording reservation.

It should be noted that instead of the DTMF signal, a G code can be created as the audio information signal corresponding to a program information to be transmitted so that the program information is transmitted by an audio information signal indicating the G code. Moreover, as the G code is constituted by combinations of numeric 0 to 9, it is possible to convert this G code into a DTMF signal for transmission.

Figure 27:
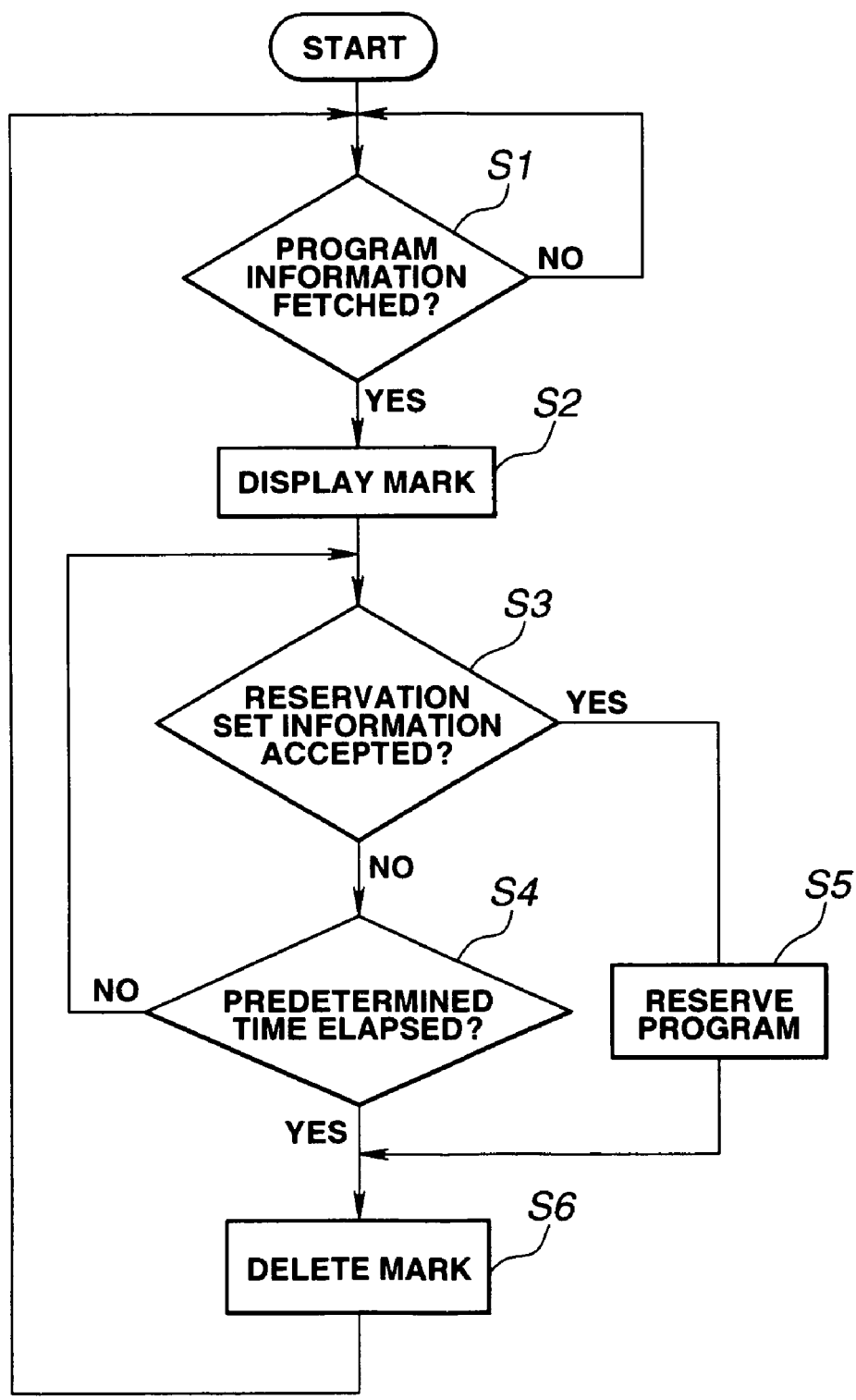
FIG. 27 is a flowchart showing a processing algorithm of a video recording reservation.

Moreover, the video deck 250 in the aforementioned video recording reservation system carries out a video recording reservation according to an algorithm shown in a flowchart of FIG. 27.

That is, according to this algorithm of video recording reservation, firstly, in step S1, it is decided whether a program information is obtained. This decision is repeatedly made until a program information is obtained. When a program information is obtained, control is pased to the next step S2.

Figure 28:
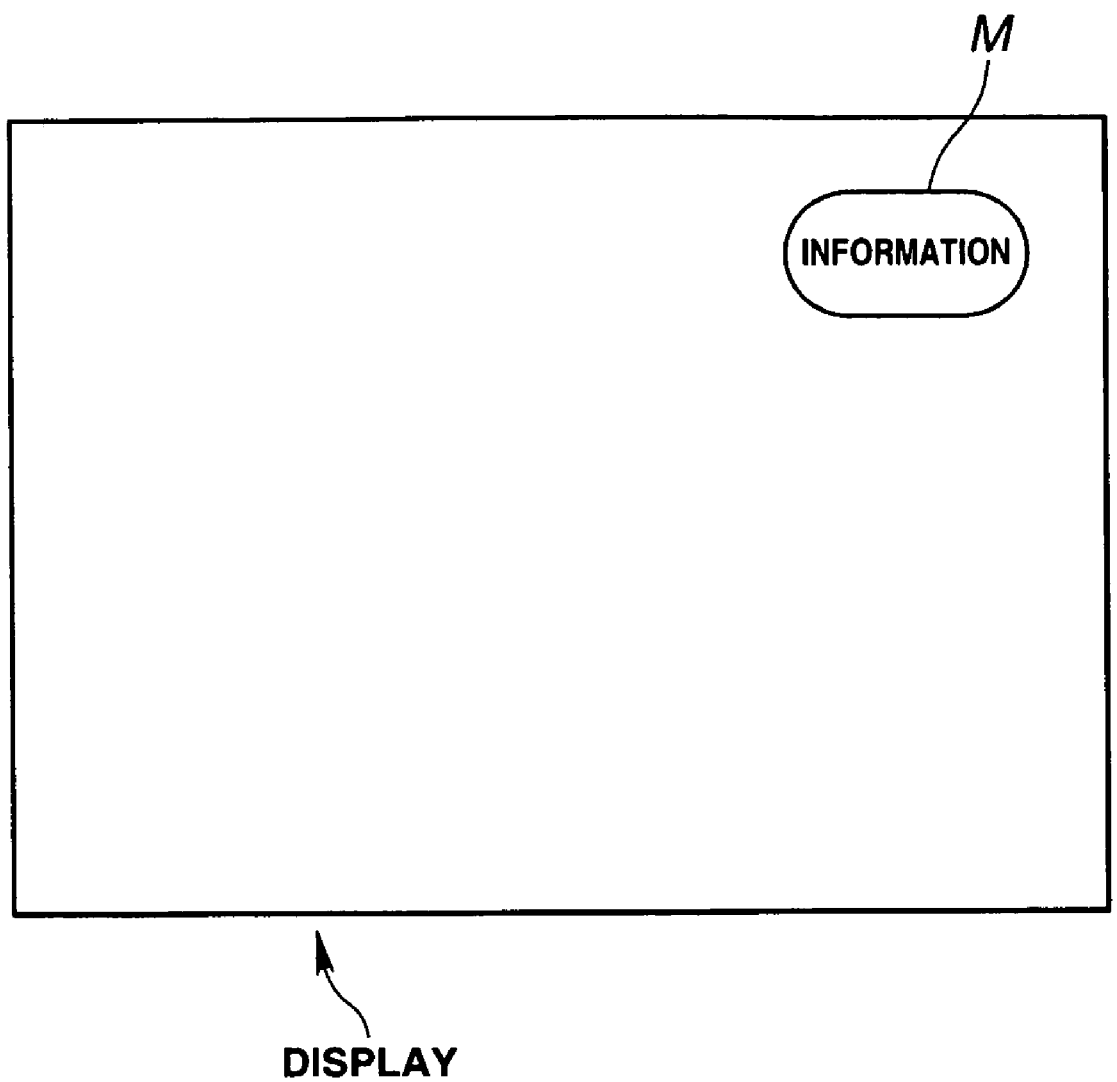
FIG. 28 shows a screen on which it is displayed that a program information has been fetched.

In step S2, a mark indicating that a program information has been obtained is superimposed on a video signal for output from the video signal output block 254. Thus, as shown in FIG. 28 for example, a mark M is displayed on the screen indicating that a program information has been obtained.

Next, in step S3, a decision is made whether a reservation set information entered from the input block 259 has been accepted. If no reservation set information has been accepted, control is passed to step S4. If a reservation set information has been accepted, control is passed to step S5.

In step S4, a decision is made whether a predetermined period of time has elapsed after a program information is fetched. If the predetermined perior of time has not been elapsed, control is returned to step S3 so as to repeatedly execute the decision processing whether a reservation set information has been accepted. Moreover, if the aforementioned predetermined period of time has elapsed, control is passed to step S6.

In step S5, a program reservation is carried out according to the program inforamtion fetched, and control is passed to step S6.

In step S6, output of the mark indicating that a program information has been fetched, from the video signal output block 54 is terminated, and control is returned to step S1.

That is, in this video deck 250, when an audio information signal is received and a program information is fetched, as shown in FIG. 28, a mark M indicating that a program information has been fetched is superimposed on a video signal for output from the video signal output block 254 fr a predetermined period of time, during which a reservation set information entered from the input block 259 is accepted for carrying out a program reservation.

It should be noted that in the video deck 250 which carries out a video recording reservation according to the aforementioned algorithm, only during a predetermined period of time while the mark M indicating that a program information has been fetched is superimposed on a video signal and outputted from the video signal output block 250, a program reservation can be carried out according to the program information fetched. However, it is also possible to retain a program information fetched, in the program information storage bloc 257 for a predetermined period such as one day so that in response to a reservation set information entered from the input block 259, a video reservation can be carried out according to the program information retained in the program information storage block 257.

Here, in the program reservation method according to the present invention, a program information to be transmitted is transmitted as an audio information signal together with an audio signal. Consequently, the present invention can be applied to an apparatus having a function of receiving an audio signal such as a television reception apparatus, radio reception apparatus, video/audio signal reception/recording/reproduction apparatus. By using a program information indicated by the audio information signal, it is possible to readily carry out a program reservation.

In the audio control signal transmission apparatus according to the present invention, an audio control signal corresponding to a control instruction specified by the control instruction input means is created by the audio control signal generating means, so that an audio signal to be transmitted iw outputted together with the audio control signal from the signal output means as a radio wave or sound wave. Consequently, it is possible to transmit an audio control signal corresponding to a control instruction specified by the control instruction input means, to reception means having a function for receiving the audio control signal.

In the audio control signal reception apparatus according to the present invention, an audio control signal inputted together with an audio signal to the signal input means is extracted so that a control instruction given as this audio control signal is specified by the control instruction specifying means and this control instruction is outputted from the control instruction output means. Consequently, it is possible to supply to means to be controlled, a control instruction corresponding to an audio control signal entered through the signal input means.

Moreover, in the audio control signal reception apparatus according to the present invention, an audio control signal inputted together with an audio signal to the signal input means is extracted so that a control instruction given as this audio control signal is specified by the control instruction specifying means and this control instruction is executed, enabling to operate means to be controlled, by the control instruction corresponding to the audio control signal entered through the signal input means.

Moreover, in the audio control signal based control system according to the present invention, it is possible to control an apparatus to be controlled, by using a control instruction corresponding to an audio control signal transmitted from the audio control signal transmission apparatus.

Moreover, in the audio control signal based control system according to the present invention, an audio control signal reception apparatus is provided for outputting as a sound wave a control instruction corresponding to an audio control signal transmitted from an audio control signal transmission apparatus, thus enabling to control an apparatus to be controlled, via this audio control signal reception apparatus. That is, it is possible to control an apparatus to be controlled, by using a control instruction corresponding to an audio control signal transmitted from the audio control signal transmission apparatus.

Furthermore, in the audio control signal based control method according to the present invention, an audio control signal is generated corresponding to a control instruction specified and the generated audio control signal is transmitted together with an audio signal to be transmitted, so that an apparatus to be controlled receives the audio control signal together with the audio signal, extracts the audio control signal, and executes a control instruction given by the audio control signal. Thus, it is possible to carry out control by way of a control instruction corresponding to an audio control signal.

In the program information transmission apparatus and transmission method according to the present invention, the audio information signal generating means generates an audio information signal corresponding to a program information entered by the program information input means, so that the audio information signal is multiplexed by the signal multiplexing means with an audio signal to be transmitted, thus enabling to transmit a program information as an audio information signal together with an audio signal.

Moreover, in the program reservation apparatus and the program reservation method according to the present invention, the reception means receives an audio information signal indicating a program information transmitted together with an audio signal to be transmitted, and the audio information signal received is extracted by the program information specifying means, and a program information indicated by the audio information signal is stored in the program information storage means, so that according to a reservation set information entered by the input means, the control means controls the aforementioned reception means to use the program information stored in the program information storage means to reserve a program to be received and to receive the program reserved. Thus, by using a program information indicated by an audio information signal transmitted together with an audio signal to be transmitted, a program reservation can readily be carried out.

Furthermore, in the program reservation apparatus and the program reservation method according to the present invention, the reception means receives an audio information signal indicating a program information transmitted together with an audio signal to be transmitted, and the audio information signal received is recorded/reproduced via a recording medium by the recording/reproduction means, and the audio information signal reproduced is extracted by the program information specifying means, and a program information indicated by the audio information signal is stored in the program information storage means, so that according to a reservation set information entered by the input means, the control means can control the reception means to use a program information stored in the program information storage means, to reserve a program to be received, and receive the program reserved. Thus, by using a program information indicated by an audio information signal recorded/reproduced together with an audio signal via recording medium, a program reservation can readily be carried out.

What is claimed is:

1. A control signal based control system comprising:
a television signal transmitter configured to transmit a Dual Tone Multi-Frequency (DTMF) control signal corresponding to a control instruction and an audio signal to be transmitted,
said television signal transmitter comprising
control instruction input means for specifying a control instruction to be transmitted, said control instruction corresponding to at least one of a power on command, power off command, start recording command and stop recording command;

a DTMF control signal generating means for generating a control signal corresponding to a control instruction determined by said control instruction input means;

signal output means for transmitting a DTMF control signal generated by said DTMF control signal generating means, wherein said signal output means outputs a DTMF control signal corresponding to a control instruction and an audio signal to be transmitted, wherein said DTMF control signal is superimposed on said audio signal to be transmitted;

a television signal receiver, comprising a DTMF control signal reception apparatus for receiving said DTMF control signal transmitted together with said audio signal from said television signal transmitter an extraction means for extracting said DTMF control signal, a speaker configured to output as a sound wave, said DTMF control instruction corresponding to said DTMF control signal; and a video/audio signal recording/reproduction apparatus, comprising a DTMF control signal reception means for receiving the DTMF control signal transmitted as a sound wave from the speaker of the television signal receiver;

a DTMF tone decoder configured to detect the frequency components contained in the received DTMF control signal;

control instruction specifying means for comparing the detected frequency components with DTMF signal strings stored in a memory which correspond to one of a power on command, power off command, start recording command and stop recording command;

a processor configured to execute the control instruction determined by said control instruction specifying means, wherein said video/audio signal recording/reproduction apparatus is controlled by the outputted sound wave corresponding to the DTMF control instruction from said television signal receiver.

* * * * *

UNITED STATES PATENT AND TRADEMARK OFFICE
CERTIFICATE OF CORRECTION

PATENT NO. : 6,985,782 B1
APPLICATION NO. : 09/123123
DATED : January 10, 2006
INVENTOR(S) : Koichiro Watanabe It is certified that error appears in the above-identified patent and that said Letters Patent is hereby corrected as shown below:

Cover page, title line 2, change "APPARTUS" to --APPARATUS--.
Column 1, line 2, change "APPARTUS" to --APPARATUS--.
Column 5, after line 21, insert --Fig. 14 is a block diagram showing another configuration example of a television transmission apparatus according to the present invention--.
Column 6, line 35, change "lock" to --block--.
Column 13, line 43, change "n" to --in--.
Column 14, line 10, change "siganl" to --signal--;
        line 26, change "characer" to --character--.
Column 15, line 21, change "an" to --and--.
Column 17, line 31, change "siganl" to --signal--.
Column 18, line 4, change "vide" to --video--.
Column 19, line 36, change "vide" to --video--,
Column 20, line 5, change "recognizes" to --recognize--;
        line 29, change "pased" to --passed--;
        line 44, change "perior" to --period--;
        line 51, change "inforamtion" to --information--;
        line 60, change "fr" to --for--.
Column 21, line 26, change "iw" to --is--.

Signed and Sealed this

First Day of August, 2006

JON W. DUDAS
*Director of the United States Patent and Trademark Office*